(12) United States Patent
Elovici et al.

(10) Patent No.: US 8,171,554 B2
(45) Date of Patent: May 1, 2012

(54) SYSTEM THAT PROVIDES EARLY DETECTION, ALERT, AND RESPONSE TO ELECTRONIC THREATS

(76) Inventors: Yuval Elovici, Moshav Arugot (IL); Gil Tachan, Omer (IL); Asaf Shabtai, Carmei Yosef (IL)

( * ) Notice: Subject to any disclaimer, the term of this patent is extended or adjusted under 35 U.S.C. 154(b) by 912 days.

(21) Appl. No.: 12/025,269

(22) Filed: Feb. 4, 2008

(65) Prior Publication Data
US 2010/0031358 A1 Feb. 4, 2010

(51) Int. Cl.
*H04L 29/06* (2006.01)
(52) U.S. Cl. ............ 726/24; 726/1; 726/2; 726/22; 726/23; 713/151; 713/181; 713/187; 713/188
(58) Field of Classification Search ............ 726/22–24, 726/1, 2; 713/201, 150–181, 187, 188
See application file for complete search history.

(56) References Cited

U.S. PATENT DOCUMENTS

| | | | |
|---|---|---|---|
| 5,440,723 A | | 8/1995 | Arnold |
| 6,807,569 B1 * | | 10/2004 | Bhimani et al. ............ 709/217 |
| 7,047,369 B1 | | 5/2006 | Gruper |
| 7,080,408 B1 * | | 7/2006 | Pak et al. ............ 726/24 |
| 2002/0023227 A1 * | | 2/2002 | Sheymov et al. ............ 713/201 |
| 2005/0144480 A1 * | | 6/2005 | Kim et al. ............ 713/201 |
| 2006/0026683 A1 * | | 2/2006 | Lim ............ 726/23 |
| 2006/0037080 A1 * | | 2/2006 | Maloof ............ 726/24 |
| 2006/0075504 A1 * | | 4/2006 | Liu ............ 726/25 |
| 2006/0123481 A1 * | | 6/2006 | Bhatnagar et al. ............ 726/24 |
| 2009/0077663 A1 * | | 3/2009 | Sun et al. ............ 726/23 |
| 2010/0212013 A1 * | | 8/2010 | Kim et al. ............ 726/23 |

FOREIGN PATENT DOCUMENTS

| | | | |
|---|---|---|---|
| EP | 1494427 A2 * | 5/2004 | |
| WO | 2006063052 A | 6/2006 | |

OTHER PUBLICATIONS

Willems et al., "Toward Automated Dynamic Malware Analysis using CWSandbox", IEEE Security and Privacy, vol. 5, Issue 2, Mar. 2007.*
Reddy et al., "N-gram analyis for Computer Virus Detection", Journal in Computer Virology, 2006, vol. 2, No. 3, pp. 231-239.*

* cited by examiner

*Primary Examiner* — Vivek Srivastava
*Assistant Examiner* — Hee Song
(74) *Attorney, Agent, or Firm* — Roach Brown McCarthy & Gruber, P.C.; Kevin D. McCarthy

(57) ABSTRACT

The invention is a computer system that provides early detection alert and response to electronic threats (eThreats) in large wide area networks, e.g. the network of an Internet Services Provider or a Network Services Provider. The system of the invention accomplishes this by harnessing the processing power of dedicated hardware, software residing in specialized servers, distributed personal computers connected to the network, and the human brain to provide multi-layered early detection, alarm and response. The layers comprise: a Protection Layer, which detects and eliminates from the network data stream eThreats known to the system; a Detection Layer, which detects and creates signatures for new eThreats that are unknown to the system; an Expert Analysis Layer, which comprises a group of human experts who receive information from various components of the system and analyze the information to confirm the identity of new eThreats; and a Collaborative Detection & Protection Layer, which detects potential new eThreats by processing information received from various system agents and users. A Dynamic Sandbox Protection Layer associated with the distributed personal computers connected to the network. can optionally be part of the system of the invention.

7 Claims, 8 Drawing Sheets

SYSTEM THAT PROVIDES EARLY DETECTION, ALERT, AND RESPONSE TO ELECTRONIC THREATS

FIELD OF THE INVENTION

The invention is concerned with the field of network security. Specifically the invention relates to a system that provides multi-layered early detection, alert, and response to electronic threats in large wide area networks.

BACKGROUND OF THE INVENTION

Publications and other reference materials referred to herein, including reference cited therein, are incorporated herein by reference in their entirety and are numerically referenced in the following text and respectively grouped in the appended Bibliography which immediately precedes the claims.

The infrastructure of a large Internet Service Provider (ISP) or Network Service Provider (NSP) typically comprises a constantly growing network of heterogeneous routers interconnecting millions of customer-devices. This network enables the network customers to exchange data of various formats created and consumed by a plethora of applications. Recent industry reports [1] suggest that customers obtain electronic threats (eThreats) mainly from the internet. eThreats comprise a variety of attacks which can be classified into three main categories: worm-related, non-worm related (e.g., virus, Trojan), and probes (e.g., spyware, adware, identity theft, and phishing).

While methods and technology for securing networks against intrusions continue to evolve, the basic problems are extremely challenging for a number of reasons. First, hackers who perpetrate intrusions continue to find ingenious ways to compromise remote hosts and frequently make their tools publicly available. Second, the size and complexity of the Internet, including end-host operating systems, make it likely that there will continue to be vulnerabilities for a long time to come. Third, sharing of information on intrusion activity between networks is complicated by privacy issues, and while there are certainly anecdotal reports of specific port scanning methods and attacks, there is very little broad understanding of intrusion activity on a global basis [2-5, 15, 16]. Because of these challenges, current best practices for Internet security rely heavily on word-of-mouth reports of new intrusions and security holes through entities such as CERT (www.cert.org) and DSHIELD (www.dshield.org).

During the first six months of 2004, the overall number of new Windows viruses and worms grew by 450% compared to the same period in 2003[1]. The average time between the announcement of a new vulnerability and the appearance of associated exploit code was 5.8 days. Once exploit code is made available, a new vulnerability can be widely scanned-for and exploited quickly. This means that, on average, customers have less than a week to patch all their systems on which the vulnerable application is running. The potential threat posed by a new vulnerability is worsened if the application in which the vulnerability is found is widely deployed, i.e., a Web server or database application. Recent widespread worms have illustrated the dangers of the narrow "vulnerability-to-exploit" window (e.g. Witty worm was discovered only two days after the vulnerability it exploited was made public). The ability of malicious code writers to rapidly upgrade bot (short for "robot") networks, compounds the dangers posed by such a brief vulnerability-to-exploitation window. Furthermore, as worms are becoming more sophisticated and, in many cases, remotely controlled by attackers, the potential impact on enterprises and customers is significant. Once a new vulnerability is announced, organizations must introduce security countermeasures before an exploit is made available, or risk having their systems exploited.

In addition to the worm-related attacks which propagate in the network in various ways, other types of malicious codes are propagated manually and in many cases the malicious code is actually an unobtrusive information-gathering probe.

As a case in point, Trojans are increasingly being installed via malicious Web sites. They exploit browser vulnerabilities that allow malicious code authors to download and execute the Trojans with little or no conscious user interaction. Trojans appear to serve some useful purpose, which encourages users to download and run them, but actually carry a destructive function. They may masquerade as legitimate applications available for download from various sources or be sent to an unsuspecting user as an email attachment. Since Trojans do not replicate like viruses and worms (although they may be delivered by worms) they typically do not receive as much media attention. However, if they are executed on a computer they can be extremely destructive, with payloads ranging from unauthorized export of confidential data to surreptitious reformatting of hard drives.

The threatening situation described above has been amplified in part by increased global terrorism and criminal activities on the Web in recent years. Today the Web is used as an enabling platform for a plethora of illegal activities ranging from credit card fraud, through identity phishing, to transferring money and orders. Web application attacks are expected to increase in the near future; targeted attacks on firewalls, routers, and other security devices protecting users' systems will be a growing security concern; sophisticated methods of control and attack synchronization that are difficult to detect and locate will be used, and finally, more attempts to exploit mobile devices will be documented.

The eThreat posed to a NSP is especially significant because they are huge, service-oriented companies with tens of millions of customers, operating in an open networked environment which blends a plethora of technologies. This situation makes the NSP especially susceptible to eThreats propagated across networks. Thus, it calls for a significant investment in developing a comprehensive conceptual model that will enable the detection and prevention of both known and new forms of eThreats.

Many different types of defense mechanisms have been proposed for dealing with the above described eThreats. Among these mechanisms are the following:

Data Mining Approach: The Minnesota Intrusion Detection System (MINDS).

Data Mining has been used extensively in recent years as an enabling technology for intrusion detection applications [7, 8]. The overall goal for MINDS [9, 10] is to be a general framework and system for detecting attacks and threats to computer networks. Data generated from network traffic monitoring tends to have very high volume, dimensionality and heterogeneity. Coupled with the low frequency of occurrence of attacks, this makes standard data mining algorithms unsuitable for detecting attacks. In addition, cyber attacks may be launched from several different locations and targeted to many different destinations, thus creating a need to analyze network data from several locations/networks in order to detect these distributed attacks. The first step in MINDS includes constructing features that are used in the data mining analysis. Basic features include source IP address, source port, destination IP (internet protocol) address, destination port, protocol, flags, number of bytes, and number of packets.

Derived features include time-window and connection-window based features. Time window based features are constructed to capture connections with similar characteristics in the last t seconds, since typically DOS and scanning attacks involve hundreds of connections. After the feature construction step, the known attack detection module is used to detect network connections that correspond to attacks for which the signatures are available, and then to remove them from further analysis. Next, the data is fed into the MINDS anomaly detection module that uses an outlier detection algorithm to assign an anomaly score to each network connection. A human analyst then has to look at only the most anomalous connections to determine if they are actual attacks or other interesting behavior. The MINDS association pattern analysis module summarizes network connections that are ranked highly anomalous in the anomaly detection module. The human analyst provides a feedback when analyzing created summaries of detected attacks and deciding whether these summaries are helpful in creating new rules that may be further used in the known attack detection module.

The Signature-Based Approach: Bloom Filters

Bloom filters [11-13] were used to build a system that scans Internet traffic. Packets enter the system and are processed by Internet Protocol (IP) wrappers. The data in the packet goes to the input buffer and then flows through the content pipeline. As the packet passes through the pipeline, multiple Bloom engines scan different window lengths for signatures of different lengths. Data leaves the content pipeline, flows to the output buffer, streams through the wrappers, and then packets are re-injected into the network. If a Bloom engine detects a match, a hash table is queried to determine if an exact match occurred. If the queried signature is an exact match, the malicious content can be blocked and an alert message is generated within a User Datagram Protocol (UDP) packet, informing a network administrator, an end-user or an automated process that a matching signature has been detected.

Dynamically Reconfigurable Hardware: Field Programmable Gate Arrays (FPGA)

A platform has been implemented that actively scans and filters Internet traffic for Internet worms and viruses at multi-Gigabit/second rates using the Field-programmable Port Extender (FPX) [17-21]. Modular components implemented with Field Programmable Gate Array (FPGA) logic on the FPX process packet headers and scan for signatures of malicious software (malware) carried in packet payloads. FPGA logic is used to implement circuits that track the state of Internet flows and search for regular expressions and fixed-strings that appear in the content of packets.

Sequential Hypothesis Testing and Credit-Based Connection Rate Limiting (CBCRL): a Worm Detection System The application of mathematical modeling can be helpful for better defending systems against malware attacks [27, 30, 35].

Port Scanning Detection: The DIB:S/TRAFEN (The Dartmouth ICMP BCC: System Tracking and Fusion Engine)

Port scanning detection [26] is an effective technique for providing defense against port scanning attacks which attempt to discover communication channels which can be penetrated and exploited. As a case in point, the idea underlying DIB:S/TRAFEN [25] is that routers send "blind carbon copies" of ICMP (internet control message protocol) type 3 messages to a Collector who analyzes the messages, looking for signatures of worm scanning and correlating observations to track worm infections. The technique employs a simulator system capable of simulating worm infections and collecting the ICMP 3 messages in a tcpdump file for further analysis. For the collection of the ICMP destination unreachable messages, the system relies on Internet routers to forward copies of those messages that they generate to a central collector. From there, they are distributed to an array of analyzers that all report back to a Correlator system. The analyzers generate reports of significant behavior and create a set of identifying characteristics. Based on those characteristics the Correlator determines whether an active worm is propagating by comparing reports received from other analyzers. Information provided by the ICMP protocol has been employed by other security applications as well [23, 24].

Static Analysis of Executables: The SAFE System

SAFE is a virus detector resilient to code obfuscations [28]. To detect malicious patterns in executables, an abstract representation of the malicious code is built. The abstract representation is the "generalization" of the malicious code, e.g., it incorporates obfuscation transformations, such as superfluous changes in control flow and register reassignments. Similarly, an abstract representation of the executable in which one is trying to find a malicious pattern must be constructed. Once the generalization of the malicious code and the abstract representation of the executable are created, it is possible to detect the malicious code in the executable. The malicious code is generalized into an automaton with uninterrupted symbols. Uninterrupted symbols provide a generic way of representing data dependencies between variables without specifically referring to the storage location of each variable. A pattern-definition loader component takes a library of abstraction patterns and creates an internal representation. These abstraction patterns are used as alphabet symbols by the malicious code automaton. An executable loader component transforms the executable into an internal representation, here the collection of control flow graphs (CFGs), one for each program procedure. An annotator component inputs a CFG from the executable and the set of abstraction patterns and produces an annotated CFG, the abstract representation of a program procedure. The annotated CFG includes information that indicates where a specific abstraction pattern was found in the executable. The annotator runs for each procedure in the program, transforming each CFG. The detector component computes whether the malicious code (represented by the malicious code automaton) appears in the abstract representation of the executable (created by the annotator). This component uses an algorithm based upon language containment and unification. Another application of static code analyses for detecting buffer overflow attacks is described in [29].

Vulnerability Driven Network Filters: The Shields System

Software patching has not been effective as a first-line defense against large-scale worm attacks, even when patches have long been available for their corresponding vulnerabilities. Generally, people have been reluctant to patch their systems immediately, because patches are perceived to be unreliable and disruptive to apply. Shields [31-34] uses vulnerability-specific, exploit-generic network filters installed in end-systems once vulnerability is discovered, but before a patch is applied. These filters examine the incoming or outgoing traffic of vulnerable applications, and correct traffic that exploits vulnerabilities. Shields are less disruptive to install and uninstall, easier to test for bad side effects, and hence more reliable than traditional software patches. The architecture of Shields functions as follows: Whenever a new Shield policy arrives or an old policy is modified, the Policy Loader integrates the new policy with an existing specification (Spec) if one exists, or creates a new one otherwise. The Shield policy is expressed in the Shield policy language. Policy loading involves syntax parsing, and the resulting syntax tree is also stored in the Spec for the purpose of run-time interpretation of shielding actions. When raw bytes arrive at Shield from a port, an Application Dispatcher unit is invoked to determine which Spec to reference for the arrived data, based on the port number. The Application Dispatcher forwards the raw bytes and the identified Spec to a Session Dispatcher unit for event and session identification. On obtaining the locations of the session ID, message type, and message boundary marker from the corresponding Spec, the Session Dispatcher extracts multiple messages (if applicable), recognizes the event type and session ID, and then dispatches the event to the corresponding state machine instance. There is one state machine instance (SMI) per session. Given a newly-arrived event and the current state maintained by the corresponding session state, the SMI consults the Spec regarding which event handler to invoke. Then the SMI calls a Shield Interpreter unit to interpret the event handler. The Shield Interpreter interprets the event handler, which specifies how to parse the application-level protocol payload and examine it for exploits. It also carries out actions like packet-dropping, session tear-down, registering a newly-negotiated dynamic port with Shield, or setting the next state for the current SMI.

The academic literature reviewed above suggests that there exist a plethora of approaches, models and tools for addressing the problem of eThreats. Nevertheless, each initiative described above provides a partial solution to a very small part of a particular problem. They do not target all of the major facets of the eThreat protection challenge. Specifically: MINDS deals with threats to computer networks only and does not protect devices such as PCs, cell-phones, etc. It does not provide detection in real-time, and protection against polymorphism/metamorphism. FPGA and Bloom Filters provide a solution focused on throughput performance criteria, but can only deal with certain kinds of known eThreats that can be identified by their hashing or regular expression signature. Shields and the methods of Sequential Hypothesis Testing/credit-based connection rate limiting address only worm propagation, whereas SAFE addresses only virus threats. Finally, DIB:S/TRAFEN deals with only Port Scanning Detection.

All in all, it is clear that the above initiatives do not provide an overall satisfactory solution to the eThreat problem. The problem of eThreats has a dynamic nature, with new kinds of threats emerging and old threats evolving into different kinds of threats. For example, adware, spyware, and identity theft by way of phishing are "younger" threats compared to the virus threat and their impact has been felt substantially only in the last two to three years. Considering the fact that content on the Web cannot be effectively regulated, the eThreat challenge posed by crackers, terrorists, criminals, etc. is overwhelming.

It is therefore a purpose of the present invention to provide a system that offers a flexible and adaptive security platform against eThreats in NSP networks.

Further purposes and advantages of this invention will appear as the description proceeds.

SUMMARY OF THE INVENTION

The invention is a computer system that provides early detection alert and response to electronic threats in large wide area networks, e.g. the network of an Internet Services Provider (ISP) or a Network Services Provider (NSP). The system of the invention accomplishes this by harnessing the processing power of dedicated hardware, software residing in specialized servers, distributed personal computers connected to the network, and the human brain to provide multi-layered early detection, alarm and response to eThreats. The layers comprise: a Protection Layer, which detects and eliminates from the network data stream eThreats known to the system; a Detection Layer, which detects and creates signatures for new eThreats that are unknown to the system; an Expert Analysis Layer, which comprises a group of human experts who receive information from various components of the system and analyze the information to confirm the identity of new eThreats; and a Collaborative Detection & Protection Layer, which detects potential new eThreats by processing information received from various system agents and users. A Dynamic Sandbox Protection Layer associated with the distributed personal computers connected to the network can optionally be part of the system of the invention.

A preferred embodiment of the computer system of the invention comprises one or more of each of the following modules: Anonymity, Privacy and Secrecy Module, Known eThreat Handler Module, Data Stream Manager Module, New eThreat Detection Module, Storage Manager Module, Protection & Feedback Agent, Collaborative eThreat Recognition Module, Expert Group Feedback Manager Module, Attack Trace-Back Module, and Risk Assessment Module. All of the modules except the Protection & Feedback Agent are under the direct control of the wide area network staff.

According to an embodiment of the computer system of the invention, the major components of the Anonymity, Privacy and Secrecy Module are the Secure Network Connection and the Storage Sanitizer Component and the functionality of the Anonymity, Privacy and Secrecy Module is embedded into the various components of the system.

According to an embodiment of the computer system of the invention, the Storage Sanitizer Component is present in the Data Stream Manager Module and in the Protection & Feedback Agent.

According to an embodiment of the computer system of the invention, the Known eThreat Handler Module comprises: a hardware interface; a Recognition Component; which looks for a match between the signatures of known eThreats and the stream of Internet packets; and an eThreat Signature Adaptor, which contains signature updates for eThreats written in the format used in the Recognition Component and supplies the updates to the Recognition Component. If a match is detected and the Recognition Component identifies an eThreat in a packet, then the packet will not be forwarded or will be dealt with in another manner. The Known eThreat Handler Module is a physical module that works in real-time and must be placed in the network infrastructure.

According to an embodiment of the computer system of the invention, the main component of Data Stream Manager is the Information Extraction Module, which comprises high level filters that are responsible for extracting only new, previously unobserved, files from traffic forwarded by the Known eThreat Handler Module and passing the files to the New eThreat Detection Module.

According to an embodiment of the computer system of the invention, the Collaborative eThreat Recognition Module detects potential new eThreats by processing information received from various system agents and users.

According to an embodiment of the computer system of the invention, two major responsibilities of the Storage Manager Module, which is the primary persistence device of the system are: to store and manage files received from other modules of the system and to store information about the files that it is managing.

According to an embodiment of the computer system of the invention, the main goal of the Expert Group Feedback Manager Module is to provide a set of Graphical User Interface dialogs, which will present to the group of human experts all the relevant information needed for recognition of new eThreats.

According to an embodiment of the computer system of the invention, the Attack Trace-Back module traces back the source of an eThreat using historical data on its propagation that has been collected.

According to an embodiment of the computer system of the invention, the Risk Assessment Module measures the risk of a specific eThreat and also the risk of all eThreats known by the system over the wide area network. The components of the Risk Assessment Module collect relevant information for risk assessment from the Storage Manager and provide risk assessments to the group of human experts.

All the above and other characteristics and advantages of the invention will be further understood through the following illustrative and non-limitative description of preferred embodiments thereof, with reference to the appended drawings, wherein the use of the same reference numeral in different figures identifies like parts.

DETAILED DESCRIPTION OF PREFERRED EMBODIMENTS

The invention is a computer system that provides multi-layered early detection alert and response to electronic threats in large wide area networks. The system of the invention harnesses the processing power of dedicated hardware, specialized servers, distributed personal computers connected to the network, and the human brain to provide multi-layered early detection, alarm and response to eThreats.

Generally speaking there are two types of eThreats:
Known eThreats for which the components of the system of the invention have already acquired a distinct signature; and
Unknown (New) eThreats which the components of the system of the invention have yet to encounter and classify, and for which the system needs to generate a distinct signature.

Known eThreats are identified and blocked in real-time, using lightweight dedicated hardware devices capable of detecting eThreat signatures at a rate of multi-Gigabits/sec. All of the network service provider (NSP) customers' Internet traffic flows through such devices, which are deployed at appropriate network locations.

Figure 1:
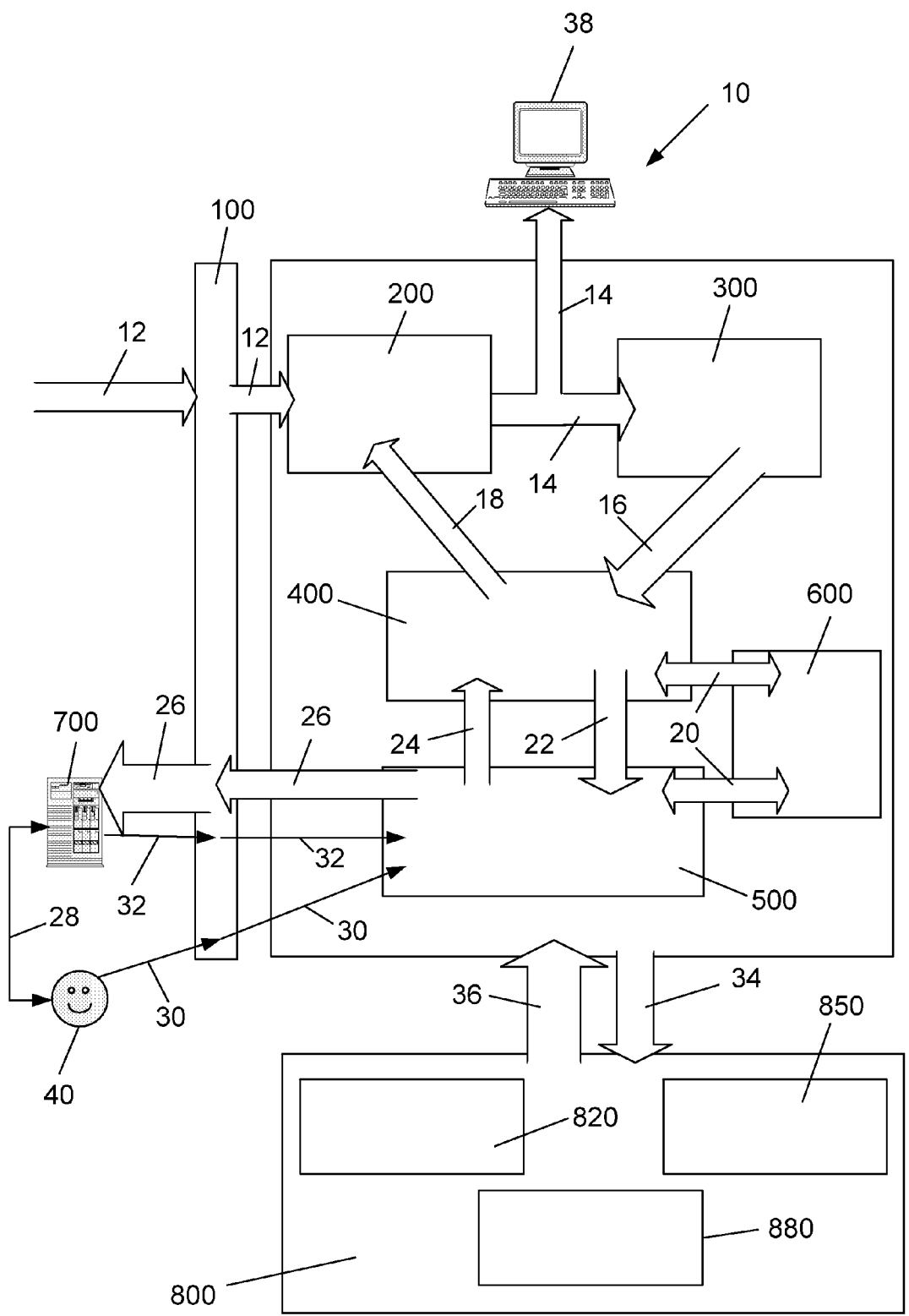
FIG. 1 shows the overall conceptual framework of the system of the invention.

Another module constantly monitors the data traffic and searches for new eThreats. This module does not work in real-time since evidence may need to be accumulated over time and since some modern algorithms are very computationally intensive. Other modules work together with these modules to help to cope with the enormous amount of data traffic. These modules focus the computational efforts on the more "important" parts of the network, using the theories of Complex and Social Networks. The conceptual framework of the system 10 of the invention, which comprises ten major modules, is shown in FIG. 1. Each module shown in FIG. 1 is comprised of several components that are not shown in this figure, but the more important of which will be described in more detail hereinbelow.

The incoming internet data stream 12 encounters the Anonymity, Privacy and Secrecy (APS) Module 100. This is a virtual module; hence it does not include specific hardware or software components. Its several components are distributed throughout the architecture. Their purpose is to ensure that the anonymity, privacy and secrecy of all the Network Service Provider's clients are preserved while enabling the architecture to perform its function.

Anonymity is preventing the association of any personal data with a specific client. In the architecture of the invention, anonymity is preserved in the following ways: Firstly, the Protection and Feedback Agent 700 does not use a user's name or personal data during authentication with the server. Secondly, the captured Internet traffic is stripped of any personal, identifying information before being processed. Thirdly, no data that may link a user to any specific piece of traffic is stored.

Privacy is preventing third parties from discovering any of a client's identifiable information. Privacy is achieved by removing private user's details captured by the Agent 700 before forwarding the user's packets to other parts of the system.

Secrecy is preventing third parties from discovering confidential information. Secrecy is achieved by encrypting data flow between the various modules of the system 10 and requiring both communicating modules to authenticate prior to any communication.

The APS module 100 includes the following components distributed through other components of architecture 10:
Sanitization components are devoted to removing and identifying data carrying personal information. These components reside in the Data Stream Manager Module (DSM) 300 that extracts data from the network and in the Protection and Feedback Agent 700 that transfers data from client's devices.

(b) A Secure Network Connection Component resides within every module of system 10 and enables secure encrypted communication. All modules in the framework send information only through this component.

The responsibility of the Known eThreat Handler Module (KEHM) 200 is to detect and remove all known to eThreats that have been detected in the inbound internet data stream 12. The KEHM 200 works in real-time and has to cope with high-speed internet traffic and to block or disarm all threats before they reach the NSP's client's computers. Many kinds of real time information are also generated by KEHM and are reported to any of the other components of architecture 10 that can make use of that information. KEHM 200 is updated by the New eThreat Detection Module 400 with the signatures of new eThreats. Input to the KEHM comprises the inbound data stream 12 or eThreat signatures 18 recognized by other modules such as the New eThreat Detection Module 400. The output is the outbound clean data stream 14, which ultimately arrives at the target computer 38.

The Data Stream Manager Module (DSM) 300 receives the clean internet data stream 14 from the Known eThreat Handler Module 200 and is responsible for intercepting the parts of the internet data stream 16 that should be sent to the New eThreat Detection Module 400 for processing.

The New eThreat Detection Module 400 is one of the most important modules of system 10. It is responsible for collecting information from various sources and processing that information using different techniques. It is constructed with openness and scalability in mind in order to keep the system adaptive to future requirements, i.e. the module 400 can easily be updated with new plug-ins providing the detection power of new algorithms or providing new functionality. The New eThreat Detection Module 400 is not connected directly to the internet data stream and does not process information in real time. The Data Stream Manager Module (DSM) 300 will focus the computational effort of module 400 "providing" it with only part of the internet data stream 16. Upon new eThreat recognition a Signature Builder component will be activated. At the end of this process the Known eThreat Handler Module 200 and the Collaborative eThreat Recognition Module 500 will be updated with a new signature 18,22 thereby instantly protecting the entire network and the client's PCs from future attacks.

The Protection & Feedback Agent 700 is an optional module that each client 40 has the right to choose to install on his or her computer. The client 40 is also able to choose which of the various functionalities of the Agent 700 should be enabled, for example it might be decided not to deploy a dynamic sand-box.

This module has the following responsibilities:
To automatically clean (following user confirmation) the client's computer of any new eThreat that has arrived during the time between when it first infiltrated the network and the response time of architecture 10.
To monitor user-content interaction 28.
To deploy a dynamic sand-box to safely open and test incoming files.
To deploy various sniffers to provide architecture 10 with automatic feedback 32 and to support the functionality of components associated with the DSM 300.
To transfer feedback 30 from client 40 to the Collaborative eThreat Recognition Module 500.
To display warning and other messages to the client.
To do all of the above without compromising the customer's anonymity, privacy, and the secrecy of the data.

The Collaborative eThreat Recognition Module 500 receives feedback 30,32 from both the Protection & Feedback Agent 700 and the End Users 40. In some cases the feedback will be subjective and in other cases will not be correct at all. Therefore this module preprocesses the feedback gathered from various sources (users and Agents) and feeds objective information 24 to the New eThreat Recognition module 400. Additionally the Collaborative eThreat Recognition Module 500 keeps all Protection & Feedback Agents 700 up to date by forwarding various kinds of information 26 such as: new eThreat signatures, configuration update, software updates, warnings, etc.

The System Control Center 800 is comprised of three modules. The Control Center receives data 34 from the other modules and return configuration and feedback data 36.

The responsibility of the Expert Group Feedback Manager Module 820 is to collect feedback from the human expert group responsible for running the architecture. In some or all cases the expert group will be asked to confirm whether or not a data stream contains a new eThreat. They will be presented with all supporting information and tools to make that determination. Using this module the experts could also set the threshold that determines when to automatically treat a potential eThreat as an actual eThreat and when to ask for confirmation before the final determination is made.

Also present in Control Center 800 are the Attack Trace-Back Module 850, which is responsible for helping in analyzing and displaying attack patterns, contamination rate, and trace-back information and the Risk Assessment Module 880, which is responsible for calculating and displaying the threat assessment of various eThreats in real time.

Figure 2:
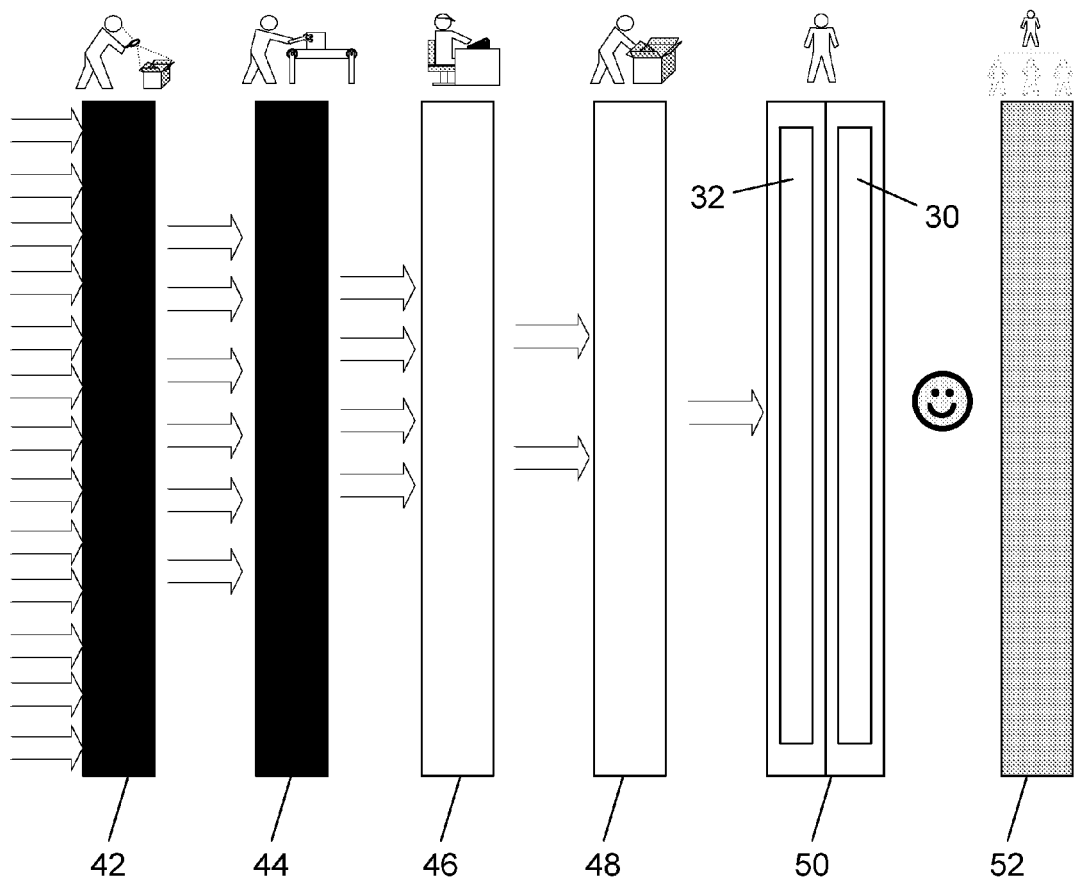
FIG. 2 shows the five layers of protection supplied by the system of the invention.

The system 10 described above with reference to FIG. 1 effectively creates several protection and detection layers. FIG. 2 shows the five layers of protection supplied by the system 10 of the invention. eThreats must overcome all of these layers in order to be of any real threat to the NSP network users.

The five layers of protection provided by the system 10 of the invention are shown in FIG. 2 are:

1. Known eThreat Protection Layer 42—Implemented via the Known eThreat Handler module 200. All of the internet traffic in the NSP network flows through this layer. No known eThreat can pass this layer.
2. New eThreat Detection Layer 44—Implemented via the New eThreats Detection Module 400 that uses different techniques in order to identify new eThreats.
3. Expert Analysis Layer 46—This is a virtual layer comprising the expert managing functions located in the Control Center 800. This layer receives conflict resolution requests from the previous layers and other pieces of information. Its purpose is to catch more stealthy new eThreats that have slipped through layer 44.
4. Dynamic Sandbox Protection Layer 48—This optional layer is implemented via the Protection & Feedback Agent 700 and is located at all the individual clients that have chosen to install it. As a downloaded file opens or executes, this layer may take action depending on its configuration, the file type, and events triggered by the action applied to the file. Different limitations will be imposed on different file types and different kinds of utility programs, thereby protecting against many of the new eThreat attacks. In some cases, the outcome of such file-openings or executions will be reported to other modules of system 10 along other kinds of information gathered. This layer can also warn clients when they are about to run programs that are not known to system 10 and for which no positive feedback has been received from other users.
5. Collaborative Detection & Protection Layer 50—Implemented via the Protection & Feedback Agent 700. Currently when a NSP customer is attacked by an eThreat there is only loss to him and no profit to him or anyone else. The aim of Layer 50 is to change this situation either by automatic feedback 32 by the Agent 700 or by explicit user feedback 30. The system will know when a new eThreat has emerged and will automatically protect the entire network from that eThreat. Thereby even a very small number of attacked users can alert and help protect tens of millions of other clients from a new eThreat.

In FIG. 2, the arrows between layers symbolically represent the number of eThreats and the "happy face" represents the fact that no eThreats are able to get through to the bulk of the NSP's clients 52.

Having briefly described the main features of the various modules of the system 10 of the invention by referring to FIG. 1, a more detailed description of the major modules and their subordinate components will now be given. This description includes a figure depicting the conceptual architecture and subordinate components comprising each module, the major interactions of the components amongst themselves and between the components of other relevant modules, a list of possible inputs and outputs accepted as requests and provided in response by each module, and an implementation scheme outlining relevant algorithms, protocols, software packages, and dedicated hardware devices, etc. which serve as the building blocks that transform the architecture into an operational, alert and robust system.

The Anonymity, Privacy and Secrecy Module 100 is a virtual one. There is no specific hardware or software component that can be called the Anonymity, Privacy and Secrecy Module 100, instead, its functionality is embedded into the various system components. A schematic description of the Anonymity, Privacy and Secrecy Module 100 is shown in FIG. 3.

Two major components of the Anonymity, Privacy and Secrecy Module 100 are the Secure Network Connection, which are implied by the double arrows that indicates encrypted connections (as opposed to the dark-headed double arrows that indicate unencrypted data), and the Sanitizer component 102.

Figure 3:
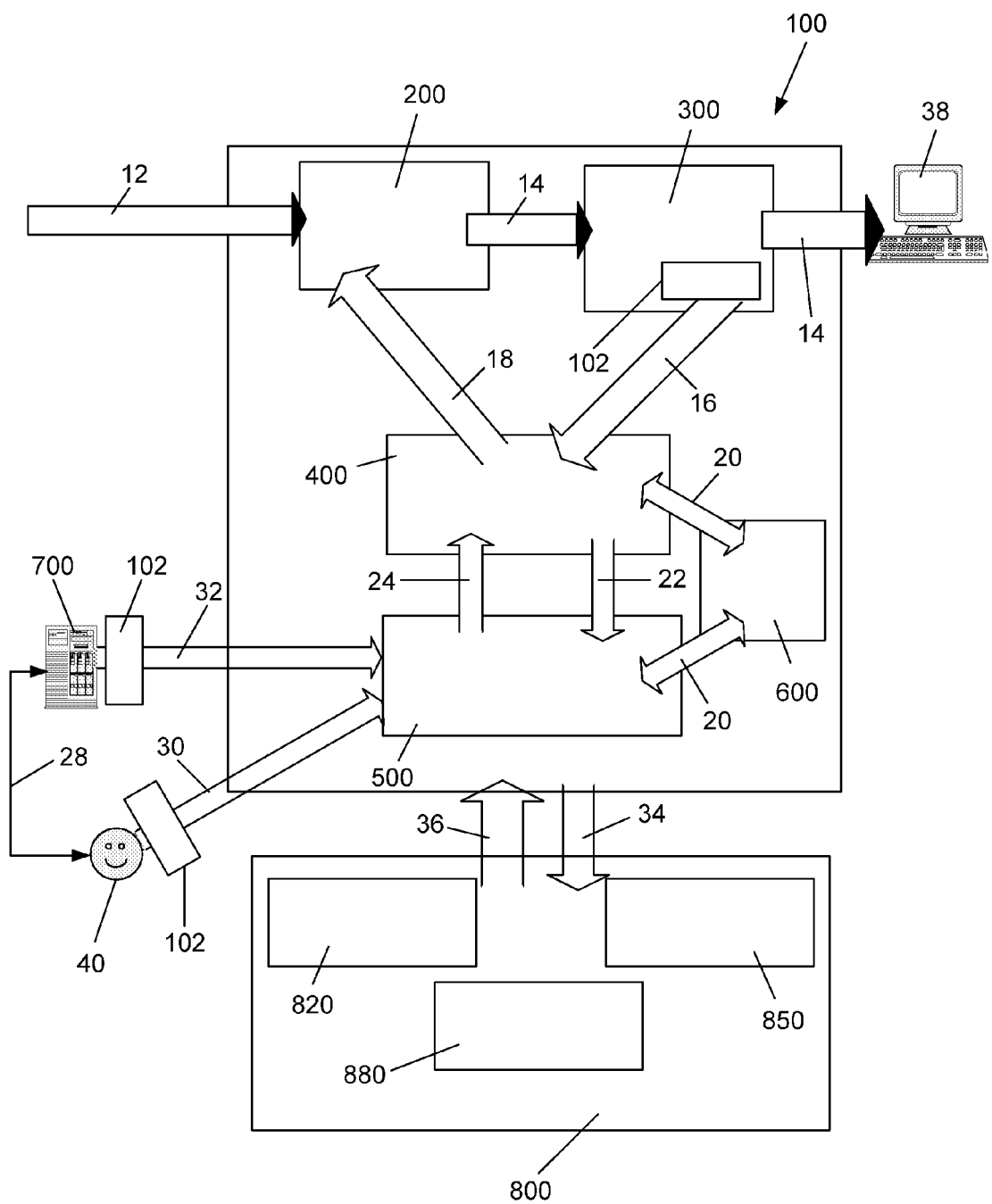
FIG. 3 shows a schematic description of the architecture of the Anonymity, Privacy and Secrecy Module.

The Secure Network Connection component is implied in FIG. 3. It exists internally in every module that communicates with other modules in the architecture. The communication is via an encrypted connection and the Secure Network Connection is in charge of preserving the secrecy of transported information. The "conservative" assumption in this regard is that any packet sent over the network is suspected of enabling eavesdropping or being maliciously manipulated by a passive or active attacker correspondingly.

Any module in the system shown in FIG. 1 can only send information over the network through the Secure Network Connection component. This constraint assures that data is only delivered to destinations which have been successfully validated as belonging to the system of the invention. Therefore no eavesdropping is computationally feasible.

The connections on the pipeline of data 12,14 from the internet through the Known eThreat Detection Module 200 and Stream Manager Module 300 to the target computer 38 are the only plain (i.e., not through the Secure Network Connection component) connections that are shown in FIG. 3. These connections do not require encryption because the data that flows through them is regular internet traffic.

Data flows through the Secure Network Connection component in two directions: (1) Inbound traffic is received by the component from another Secure Network Connection component and is delivered to the Storage Sanitizing component. Outbound traffic is a sanitized data stream, received from the Storage Sanitizing component, which is conveyed to some other distant Secure Network Connection component over the network.

The implementation scheme of the Secure Network Connection Component involves two stages:

Initiation: Both parties must be verified to be legitimate. The initiation process must also generate symmetric keys for the next stages and comply with the PFS (Perfect Forward Secrecy) property. To accomplish this SSL (Secure Sockets Layer) with both client and server side certificates may be used, as well as any tailored solution that ensures the required properties. A well-known, trusted and mature solution is preferred in this regard. In case of certificates being required, a strong hash function such as SHA-256 (or stronger) must be used, since MD5 and SHA1 have known weaknesses.

Encryption: The connection must be encrypted with a high grade security cipher. Examples are the 5 AES finalists, in particular Rijendal, and the widely known Blowfish. RC4 has known weaknesses and should be avoided.

The Sanitizer Component 102 is responsible for the privacy and anonymity of the NSP clients. The function if this module is to remove any identifying details regarding private information that are not strictly required for the process of detecting and removing eThreats. The Sanitizer needs to balance between removing enough forbidden details from the stream and retaining sufficient information to allow efficient detection and removal of eThreats by the receiving modules.

The Storage Sanitizing Component 102 is present in the Stream Manager Module 300 and in the Protection & Feedback Agent 700. These locations are chosen because module 300 extracts information from the network data stream and module 700 extracts information from client's devices. Thus these are the only two modules in system 10 that have direct access to sensitive information that needs to be sanitized.

The input to the Sanitizer 102 is the transport stream from either the Stream Manager Module 300 or the Protection & Feedback Agent 700. Its output is relayed to the Secure Network Connection component.

The operation scheme behind the Sanitizer Component 102 is a sequential application of filter algorithms. Each algorithm recognizes a specific pattern or a class of patterns of sensitive data. This data is either stripped or manipulated in a way that removes any trail to the original data. The algorithm filters may be context sensitive (e.g. protocol, stream headers or previous data) or context free. Data that is removed by the sanitizing filter is a soft collection and may be extended at runtime. Hard data items that can not be removed are Client's user names, passwords, Names, E-mail addresses, IP addresses, Visited URLs. Phone numbers and file names. Data may be abstracted in a one-way fashion instead of removed if this helps the system accuracy.

In order to identify the specified fields, that should be removed or transformed, the filter must recognize certain protocols. For ease of implementation, not all protocol handlers must be implemented, and heuristics must exist for unknown protocols. Protocols that are absolutely necessary for implementation of the sanitizer 102 are any protocols being used by more that 10% of the clients. A non-complete set of examples of such necessary protocols is: DNS, HTTP, FTP, ed2k, BitTorrent, and pop3/smtp. A set of additional protocols that might be necessary includes IRC, IMAP, and RTSP.

Figure 4:
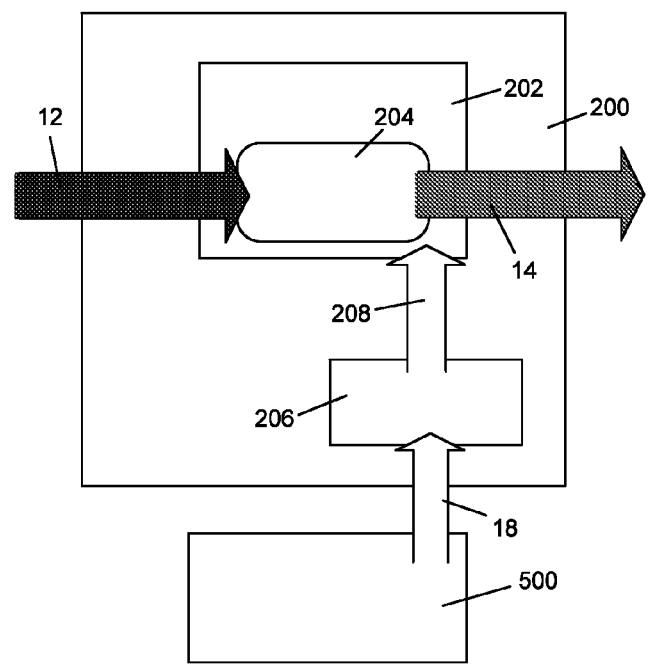
FIG. 4 shows a schematic description of the architecture of the Known eThreat Handler Module.

The main purpose of the Known eThreat Handler Module 200 is to detect and clean all the known (to the system) eThreats in the incoming Internet data stream 12. This is a physical module that works in real-time and must be placed in the NSP infrastructure. The overall architecture of the Known eThreat Handler Module 200 is shown in FIG. 4.

The Module 200 includes a hardware interface 202, Recognition Component 204 and eThreat Signature Adaptor 206.

The main input of the Recognition Component sub-module 204 is the incoming Internet data traffic 12. The Recognition Component 204 looks for a match between the signatures of known eThreats and the stream of Internet packets. If a match is detected and the Recognition Component identifies an eThreat, then the packet will not be forwarded or will be dealt with in another manner. Otherwise the cleaned Internet data stream 14 is forwarded out of the module 200. Additional input 208 to the Recognition Component 204 is received from the eThreat Signature Adaptor 206, which contains signature updates for eThreats written in the format used in the Recognition Component 204. The Recognition Component 204 must support high-speed processing of the incoming Internet data stream 12.

The system 10 of the invention enables detection and identification of new eThreats by using either signatures received from the New eThreat Detection Module 400 or explicit feedback 36 received from the Expert Group Module 820. The eThreat Signature Adaptor 206 is responsible for transforming the recognized eThreat-signature (received from Module 400 or Module 820) to hardware-specific format and to reprogram the dedicated hardware with the new signature.

Figure 5:
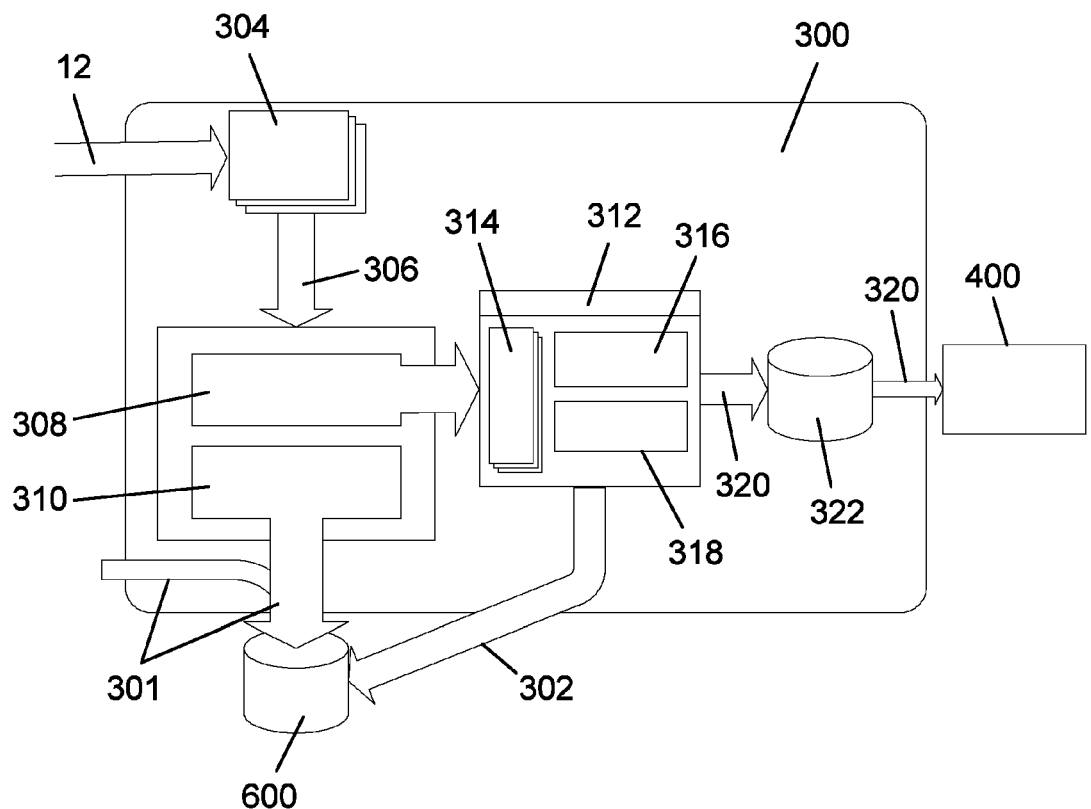
FIG. 5 shows a schematic description of the architecture of the Data Stream Manager Module.

The major components of the Data Stream Manager (DSM) Module 300 are shown in FIG. 5. This module receives a "clean" Internet data stream 12 from the Known eThreat Handler Module 14 It is responsible for extracting files 320 from Internet data stream 14 and sending them to the New eThreat Detection Module 400. It will also store temporal data on files and IP behavior in the Storage Manager 600. This is a physical module.

A set of hardware or software filters 304 examine packet headers and filters out traffic 14 (FIG. 1) that has no potential to assist with eThreat detection. This may include traffic from 100% percent secure and trusted servers or protocols that are not used for attacks.

Traffic 306 that has potential to assist with eThreat detection is sent to the Application Layer Data Stream Reconstruction component 308, which is responsible for reconstructing communications up to the application layer. It must support basic protocols such as HTTP and FTP. Other protocols can be added if necessary. This application layer data stream will be later processed by the Information Extraction component 312 before it can be packed and sent to the New eThreat Detection Module 400.

The Communication Related Information Summary component 310 in the Storage Manager module 600 may optionally store records on selected pieces of communication that have passed the packet filters.

The Information Extraction Module 312 is the main component of Data Stream Manager 300. It is responsible for extracting files contained in traffic forwarded by the Known eThreat Handler Module 200. High level filters 314 are responsible for passing only new, previously unobserved, files to the New eThreat Detection Module 400. This can be done by managing a local hash-table (on the DSM module) or by querying the Storage Manager 600. In FIG. 5, the Information Extraction component 312 is shown to contain two subcomponents an SMTP files extractor 316 and a HTTP files extractor 318. This component can also forward to the New eThreat Detection Module 400 communications that are not identified as files since it might be necessary to detect and identify Internet worms that exploit application vulnerabilities and are not transferred by the means of files, e.g. SQL Slammer. The file related output 302 of the Information Extraction component 312 that is sent to the Storage Manager Module 600 includes: hash; timestamp; payload type, e.g. file; and the ID of the DSM.

The File Buffer 322 is a limited size queue that stores files packaged by the Information Extraction component 312 until they are requested by the New eThreat Detection Module 400 or overwritten by newer files. This is a simple FIFO buffer but could be a parameterized queue able to support sudden priority changes (for example in case of an outbreak.

The DSM modules 300 are physical modules that are deployed at critical network positions. The DSM 300 is deployed on the ISP level and handles traffic originating at central users. Some of the DSM's tasks, i.e. gathering temporal information and later forwarding it to the Storage Manager 600, can be handled by the Protection & Feedback Agent 700.

Figure 6:
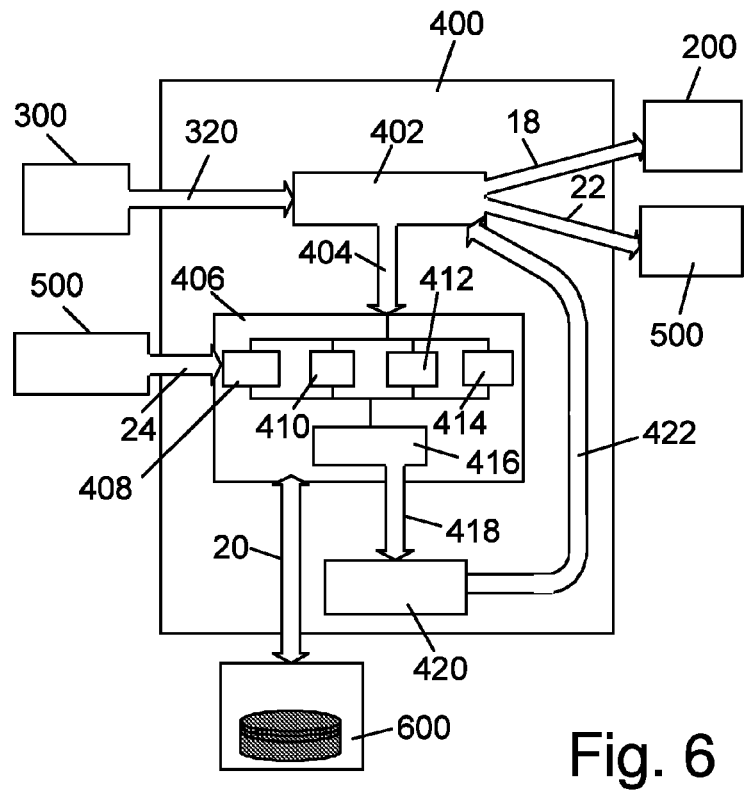
FIG. 6 shows a schematic description of the architecture of the New eThreat Detection Module.

The New eThreat Detection Module 400, whose architecture is shown in FIG. 6, is one of the most important modules in the system of the invention. It is responsible for collecting and analyzing information from a variety of sources by employing a collection of scientific methodologies. This module is not directly connected to the Internet data stream and therefore does not process information in real time. Instead the Data Stream Manager 300 will forward only the part of the Internet data stream (as files) that should be further processed. Upon recognition of a new-eThreat, the Signature Builder component 420 will be activated. Finally, the Known eThreat Handler module 200 and the Collaborative eThreat Recognition module 500 will be updated with the new signature, thereby instantly protecting the entire network and the clients' personal computers from future attacks of this type.

The following is a description of the various components which comprise the New eThreat Detection Module 400:

The Unknown eThreats processor 402 is responsible for controlling the whole detection process of new eThreats. The input of this module is a collection of files 320 which are transferred from the Data Stream Manager 300 to the detection plug-ins 406. Once a new eThreat is detected it will activate the Signature builder 420 which will update the Known eThreat Handler 200 and the Collaborative eThreat Recognition 500 with the new signature. The Unknown eThreats processor 402 will also hold priorities for the suspicious files, enabling the expeditious analysis of the most dangerous files, which will be ranked highest in the priority-list file.

All of the plug-ins have the same interface 406, wherein a suspicious file is examined as input, and a threat rank is the output. The plug-ins maintain a private database for internal use and a public database that other plug-ins can use and relate to. The following list of plug-ins is extendible and can be changed according to future needs:

The Collaborative plug-in 408 detects new eThreats such as: Viruses, Worms, Trojan, Adware, Spam and Phishing. It receives data from the Collaborative eThreat Recognition module 500.

The A.I. (Artificial Intelligence) plug-in 410 is actually a category of plug-ins. The aim of these plug-ins is to detect Viruses, Trojans, Spam and Worms by employing heuristic search, which is an emerging area in informed search under Artificial Intelligence. The informed search algorithms use knowledge in the process of searching for a goal. A goal may be a certain pattern in a file that may indicate an eThreat. The knowledge that will be used, while searching for a goal, may include structures or partial structures of extant eThreats that were recognized before initiating the search.

The Statistic Analysis plug-in 412 uses statistical analysis tools for detecting Spam. Emails that are machine-generated diverge in some of their properties from emails at large.

The Static Analysis plug-in 414 analyzes executables files to detect Viruses, Polymorphic Viruses, Worms, Trojans, Phishing and Spyware. The main idea of this plug-in is that an executable file can be analyzed before it has been executed in run time environment.

The Risk-weighing component 416 provides a final rank for each eThreat file which was analyzed previously by all of the plug-ins. All plug-ins that receive a file for processing, provide a subjective numeric grade for the "danger" posed by the eThreat. The Risk-weighing module 416 collects all ranks from the relevant plug-ins and formulates a weighed rank, according to some weighing scheme. If a final rank of a file is beyond a devisable threshold, the file will be transferred to the Signature builder 420.

The Signature builder component 420 will construct a unique signature for each new eThreat the New eThreat Detection Module 400 has encountered. The new signature 422 will be transferred to the Unknown eThreats processor 402.

The inputs of the New eThreat Detection Module 400 are:
Files 320 to be examined;
Data 24 gathered form the Collaborative eThreat Recognition Module 500; and
Data 20 from the Storage Manager 600.

The outputs of the New eThreat Detection Module are:
New eThreats signatures 422;
Conflict resolution requests (sent indirectly via the Storage Manager 600); and
Storage Manager 600 updates 20.

The Protection & Feedback Agent 700 is the only module of the system of the invention that is not under direct control of the NSP staff. It is directly controlled by the client. It is an optional software module that may run on the client's machine, being a standard PC, laptop, smart phone or any other portable device.

Some eThreats may be recognized most efficiently after execution, and only when they already reside on the target machine. Before the development of the system of the invention, the result of a client's machine becoming infected was only local loss. One of the purposes of the Protection & Feedback Agent 700 is to enable an entire community to gain from an individual client's losses.

The Protection & Feedback Agent 700 is optional as is the choice of which of its various functionalities should be enabled. A client may opt to not install it, and the system of the invention must take this possibility into account and be fully operational despite this constraint. Nevertheless, the underlying assumption connected with this module is that at least some of the clients will install it.

There are several distinct goals for the Protection & Feedback Agent:
It collects information from the client's computer in order to analyze it and detect abnormal behavior that may indicate an eThreat infection;
It allows the client to supply feedback about the systems performance in order to improve it and to supply feedback that will enter the weighting process in the Collaborative eThreat detection Module 500; and
It optionally serves as a privacy and security enhancing tool.

Figure 7:
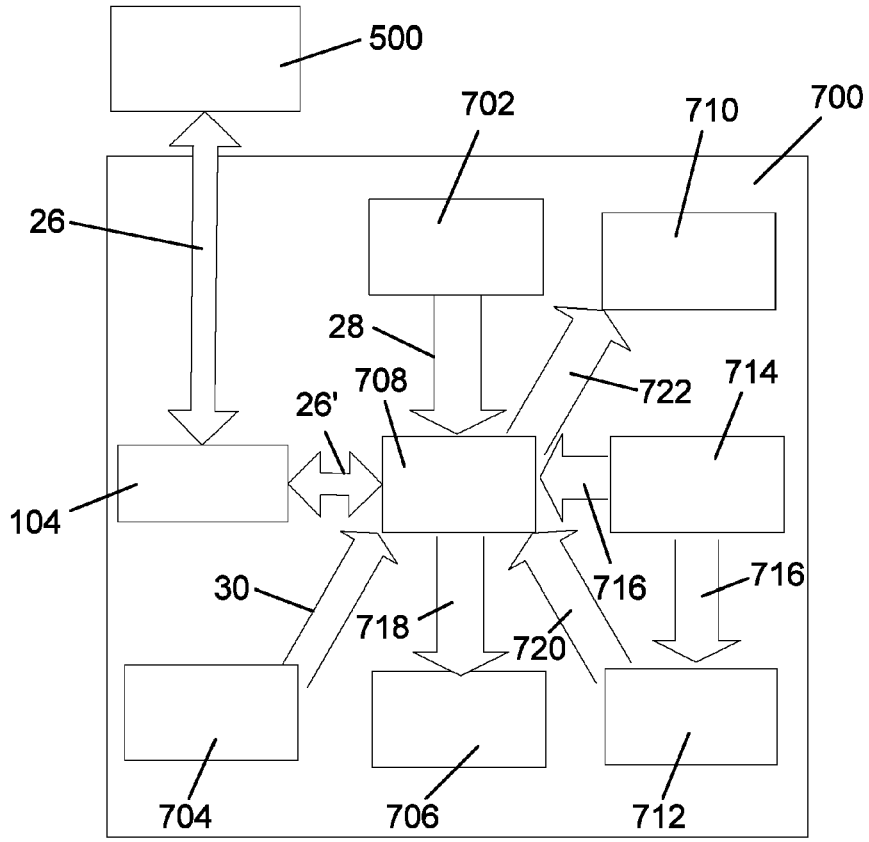
FIG. 7 shows a schematic description of the Protection & Feedback Agent.

A schematic description of the Protection & Feedback Agent 700 is depicted in FIG. 7. Note that the Protection & Feedback Agent 700 is allowed to establish contact only with the Collaborative eThreat Detection Module 500.

The following is a list of components comprising the Protection & Feedback Agent 700:

The Secure Network Connection component 104 is in charge of creating a secure connection 26 to the Collaborative eThreat Detection Module 500. A full description of component 104 can be found hereinabove in the description of the Anonymity, Privacy & Secrecy Module 100.

The User Interface Configuration component 702 comprises a set of dialogs for setting and getting parameters that affect the behavior of the Agent 700.

The User Interface Feedback 704 comprises a form of Graphical User Interface (GUI) controls that allow the client to enter feedback 30 to the system. This feedback will be sent to the Collaborative eThreat Detection Module 500 for weighting and improvement of the detection capabilities of the system 10 of the invention. The User Interface Feedback component 704 enables the user to:
Mark an executable as a possible eThreat;
report about Spam or phishing attempts; and
suggest that the machine is not behaving normally and therefore is potentially infected. In this case all of the computer's state will be sent as input to the Collaborative eThreat Detection Module 500.

The User Interface Alerts component 706 is responsible for displaying alerts when some suspicious or potentially dangerous activity is active or is about to take place. Alerts should be unobtrusive. Any type of alert can be either enabled or disabled in the User Interface Configuration component 702.

The Agent Control component 708 is responsible for making the Protection & Feedback Agent 700 function as planed. This component comprises the main routine of the module and synchronizes the activities of the various components.

The Automatic Cleaning facility 710 is an optional component that allows the removal of eThreats which may have slipped in before the system 10 had a chance to recognize them.

The Privacy monitor 712 is an optional component that is in charge of identification of attempts at transmitting private information. The main purpose of this module is to protect against phishing attempts.

The Sniffers 714 are Multiple interfaces to the Operating system that allow automatic gathering of information about ongoing activities. This information is processed by the Agent Control 708 and sanitized before being sent to the Collaborative eThreat Detection Module 500. The information will be used for automatic detection of new eThreats. The sniffer component 714 is responsible for monitoring the underlying platform and supplying data for further analysis. Sniffer types vary according to the collected information that includes:
process information;
network statistics;
memory usage
file system activity; and
registry access.

Various sniffer types may be disabled by the configuration or via instructions from the Collaborative eThreat detection Module 500. If a sniffer has been disabled by the configuration, it can not be activated remotely, while the opposite situation is allowed.

In FIG. 7, the arrows show the direction of information flow within the Agent 700, i.e.: traffic 26', configuration changes 28, raw data 716, alerts 718, privacy alerts 720, and cleaning commands 722.

The inputs of the Protection & FeedBack Agent 700 are:

Commands:

Requests for specific sniffed data

Automatic Software update commands

Information:

eThreat Signature updates

Cleaning instructions.

The outputs of the Protection & FeedBack Agent 700 are:

Sniffed Data. (After ensuring that no private information is included)

Manual FeedBack. 30 (From the User Interface)

Request for updates (since the Collaborative eThreat Detection Module 500 must not initiate the communication); and Automatic FeedBack. 32 (Based on the processed data gathered from the sniffers).

The main goal of the Collaborative eThreat Recognition Module 500 is to detect potential new eThreats by processing information received from various system agents and users. Generally speaking, each agent gathers information by monitoring the system or by using other techniques. This information contains various parameters such as: processes, CPU usage, registry access or modification, etc. For each kind of eThreat there is defined the information that an agent should gather that is related to the attributes of the threat. Some information may come directly from the user. For example, if a user concluded that some site is a phishing site, he or she can send this piece of information to the Collaborative eThreat Recognition Module 500. For each kind of eThreat there is defined the information that a user can send and the formal protocol to be used. In this module no distinction is made between a report from a Protection & Feedback Agent 700 and a report from an end user 40. Both are entries in a database maintained locally by the Collaborative eThreat Recognition Module 500 and/or in Storage Manager 600. Each row in the database refers to an agent's ID and the columns hold the threat attributes.

Table 1 depicts an example of typical database maintaining the reports from the agents and maintained on the Storage Manager 600. If the database is empty it means that there are no potential eThreats that were detected by the any agent or user. Alternatively, the attributes of potential eThreats are available for further processing. In the later case the Collaborative eThreat Recognition Module 500 tries to investigate these eThreats across multiple network segments in many different ways in order to generate the global view of what is happening. Such a view is assembled by aggregating data from multiple dispersed agents and by applying rule-based detection techniques (see description of the components of the module below). For example, as illustrated in Table 1, if some type of worm activates at some specific time, accesses the address book, and starts sending messages to some IP addresses, then aggregation performed on start-date and start-time will enable identification of a new worm (or other eThreat) that is only triggered at certain times. In this case, this module will send a message containing "A.exe", its treat level, and all its attributes to the New eThreat Detection Module 500.

TABLE 1

| Agent/<br>User<br>ID | Process<br>Name | Ontology<br>attribute 1 -<br>Start Time | Attribute 2 -<br>Sent IP<br>Packets | Attribute 3 -<br>Address book<br>access | Attribute<br>n - CPU<br>usage |
|---|---|---|---|---|---|
| 1<br>1 | A.exe | 14:00:00:001 | 17 | YES | |
| 38<br>38 | A.exe | 14:00:00:001 | 74 | YES | |

Figure 8:
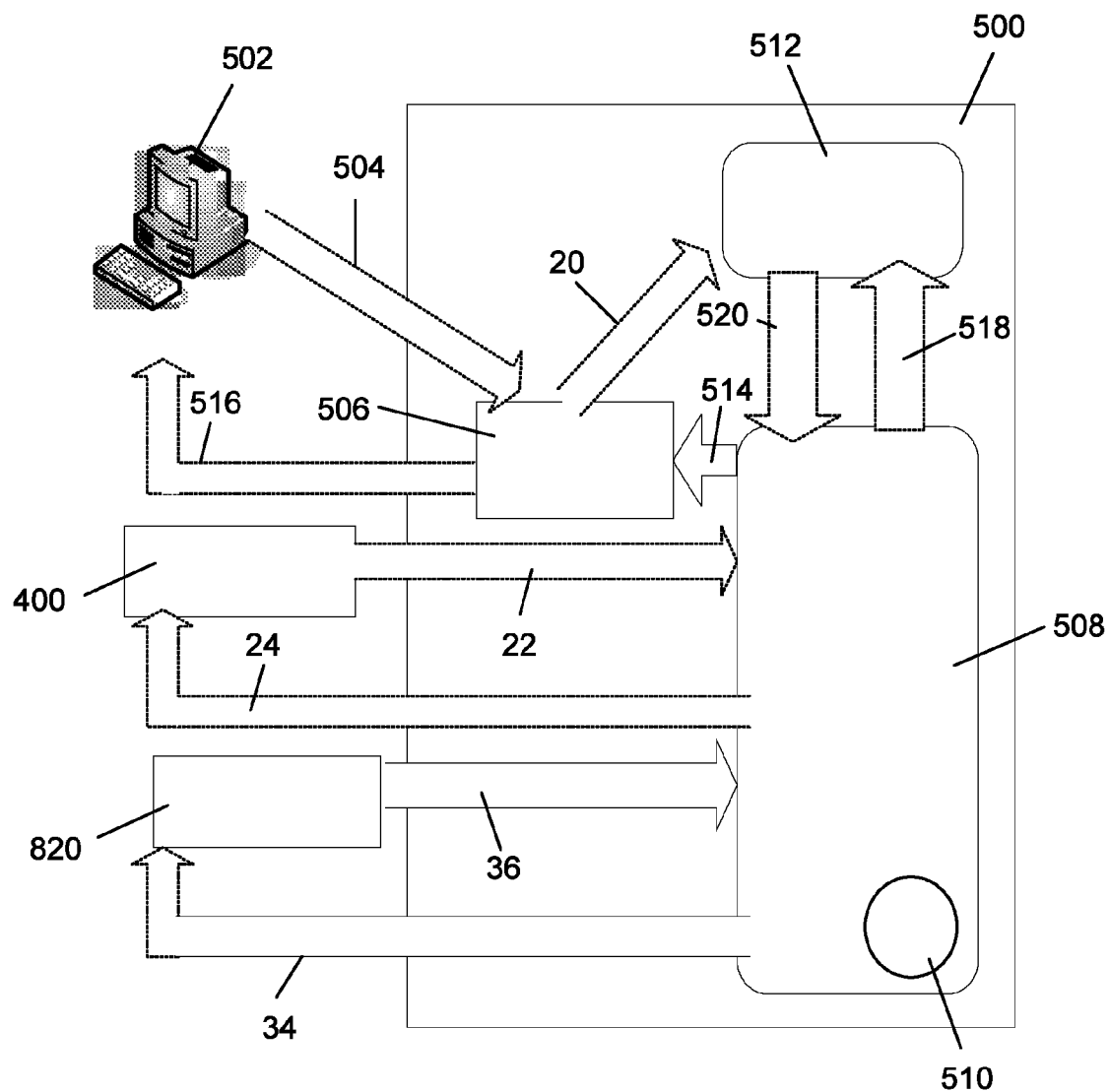
FIG. 8 shows a schematic description of the architecture of the Collaborative eThreat Recognition Module.

The overall architecture of the Collaborative eThreat Recognition Module 500 is shown in FIG. 8. This module includes Aggregation 512, Analysis 508, and Communication Interface 506 components.

The Analysis Component 508 is the main component of the Collaborative eThreat Recognition Module 500. It is activated on a periodic basis (i.e., using a timer 510) and performs the following two tasks:

Matching predefined rules: Component 508 implements rule-based detection of abnormal behavior in order to find potential eThreat Candidates. For each type of eThreat a set of generalized rules that define abnormal behavior is provided. As an example, the possible rule for detection of the worm depicted in Table 1 is: "if some process wakes up at a specific time, accesses the Address Book, and starts to send IP packets—then this is a worm (provided that this behavior was exhibited in more then 3 computers". The initial set of rules and thresholds are defined in the setup phase. These rules are formed by analyzing a variety of patterns of known attacks that have occurred on the Internet. The system attempts to match the aggregated date 520 to the different rules. The aggregated data 520 is formed from the outputs 504 of the Agents 502 transmitted through communication interface 506 and accumulated in the system as stored information 20. The matching is done by submitting requests 22 to the Aggregation component 512 and checking whether the answer is above a previously defined threshold. If some matches are found, i.e. if the rule support is greater than the threshold, then module 500 transfers all relevant information 24 to the New eThreat Detection Module 400 for further analysis.

In the event of a partial match, i.e. the support is not very small, but is still lower than the threshold, module 500 can transfer all relevant information 34 to the handling of Expert Group Feedback Manager Module 820.

The request for the special aggregation, that is, to check some special rule may come directly from the Expert Group Feedback Manager Module 820 in order to get the bird's eye view of what is happening on the network.

Generating new rules for eThreat detection: The drawback of the rule-based approach is that the basic rules are predefined, and cannot detect any novel attack. If a threat exhibits a behavior that is not prescribed by the existing rules, the threat can harm the system without being detected. In order to solve this problem the Collaborative eThreat Recognition Module 500 is automatically updated by identifying the offending stream of data or process by applying the association rules mining technique to the reports from different agents/users. There are two outputs of this task: new detection rules and identification of the processes/files that cause the bad conditions. Both of the outputs 24 and 514,516 will be sent to the New eThreat Detection Module 400 to the agents 502 respectively via Communication Interface 506. The new rules can also be received 36 from the Expert Group Feedback Manager Module 820.

The task of generating new rules takes into account the different categories of users, e.g. home users and gamers that download many movies or music, versus business users who access stock market, news, etc., as well as different types of eThreats.

If there is more than one instance of the analysis component in the system, then the queries are executed over a distributed network/database in a fast manner in order to receive an integrated view of the analysis outcome.

The Aggregation Component 512 receives requests 518 from the Analysis Component 508 and aggregates data by different fields in order to examine eThreats across multiple network segments in many different ways. Aggregating by date and time, for example, enables identification of new worms or eThreats that are only triggered at certain times; aggregating by attacker IP allows viewing of all the transition steps of an attacker's attempt across the multiple network segments, etc.

The input 518 for this component is a request for executing simple Structured Query Language (SQL) queries on the database of the agent's reports. For example, in order to check whether the rule "if some process activated at the same time in more then 3 computers (3 is the threshold), accesses the address book and then starts to send IP packets—this is a worm" occurs the Analysis component 508 will send to the Aggregation component 512 the following request:

```
select ProcessName from the database where EQUAL(StartTime)
AND
AccessAddressBook=TRUE AND
SendIPpackets=TRUE.
```

The output is the number of such entries, and if needed the agent's ID, process name, etc The implementation scheme of the Collaborative eThreat Recognition Module 500 can employ several approaches such as Association Rule Mining, Genetic Algorithms and Recommender System. However, more detailed algorithms, specifically tailored to the tasks of system 10 have been developed.

All input/output operations of the Collaborative eThreat Recognition Module 500 are implemented in the Communication Interface 506 which is a component handling communication with all Agents 700 in the system. Inputs include:

Reports 504 from all agents and users: As pointed above, in this module there is no distinction between reports from Agents 700 and users 40. Both are the entries in the database. For each kind of eThreat there is defined the information that agents/users should send. According to this information initial set of rules for matching the various eThreats are define.

Special requests 22 from the New eThreat Detection Module 400: One of the techniques employed in the New eThreat Detection Module 400 may make use of a summary of agent's reports. In this case New eThreat Detection Module 400 will send a request 22 to the Collaborative eThreat Recognition Module 500 in order to generate such a summary. Another type of request is to update 516 the agents with new detected eThreat information.

New detection rules 36 from the Expert Group Feedback Manager Module 820: The initial set of rules for each kind of eThreat will be defined during the setup phase. Nevertheless, module 500 will be able to obtain new detection rules from Expert Group Feedback Manager Module 820 and use them together with a previously defined set.

New analysis techniques from the Expert Group Feedback Manager Module: In the first stage, module 500 detects candidates for new eThreats by using rule based detection only. However it is also possible to add new detection techniques (received from the Expert Group Feedback Manager Module 820) in plug and play manner.

Software updates for the agents 502 from the Expert Group Feedback Manager Module 820: In order to update the agent's software, the Collaborative eThreat Recognition Module 500 will receive needed updates from the Expert Group Feedback Manager Module 820 and will distribute them to all known agents 502.

Requests for a bird's-eye view about what is occurring in the network received from the Expert Group Feedback Manager Module 820.

Outputs of the Collaborative eThreat Recognition Module 500 include:

Information 24 concerning potential threats is sent to the New eThreat Detection Module 400: For each potential threat that has been detected, module 500 will send all relevant information to the New eThreat Detection Module for further analysis and signature building.

Warnings and directives 516 to all agents 502: For each potential eThreat that has been detected, module 500 will send warning messages and special commands to all known agents. For example, if module 400 concludes that executing the file "A.exe" will result in system crash, it will send, through module 500, the command "Don't run A.exe" to all known agents. The formal protocol that contains the full set of the warnings and commands is defined in the design phase of system 10.

Configuration updates to all known agents: Introduction of new detection rules and new detection techniques by module 500 will result in a need to gather new information at the agent's level. In order to perform this task the Collaborative eThreat Recognition Module 500 will send the configuration update information 516 to all known agents 502.

Requests 34 to resolve special problems are forwarded, either directly or indirectly, to the Expert Group Feedback Manager Module 820.

Informational view of what is occurring on the network is sent to the Expert Group Feedback Manager Module 820.

The Storage Manager Module 600 is the primary persistence device of the system of the invention. It has two major responsibilities. First, it is responsible for storing and managing files. Second, it is responsible for storing information about the files that it is managing, e.g. information from Collaborative eThreat Module 500, plug-in information, plug-in decisions, eThreat signatures, etc.

Storage Manager Module maintains physical files that it stores in a logical storage. The logical storage is a hierarchical data structure. When Storage Manager 600 receives a new file from an initiator component, e.g. New eThreat Detection module 400, it creates new entries in the logical storage. Then, it physically copies the file to its hard drive, and produces a FileID, which is a unique identification for the file. The FileID is stored in the logical storage and sent back to the initiator component. Among other pieces of information, the Storage Manager stores eThreat signatures. Given a FileID, supplied by another module of the system, Storage Manager is able to construct a group of similar FileIDs. This group of similar FileIDs is called 'close files' for the reason that all the files in the group are not semantically different. This functionality is very important to the creation of eThreat signatures. Upon new eThreat recognition, the Signature Builder component 420 is activated. It is assisted by the Storage Manager 600, which produces the 'close files' group to create a signature. At the end of this process, the signature is stored in the Storage Manager 600 and the Known eThreat Handler module 200 and the Collaborative eThreat Recognition module 500 are also updated with the new signature.

The Storage Manager module 600 is not connected directly to the internet data stream and does not process information. The Storage Manager module 600 is connected only to the New eThreat Detection module 400 and Collaborative eThreat Recognition Module as shown in FIG. 1.

Figure 9:
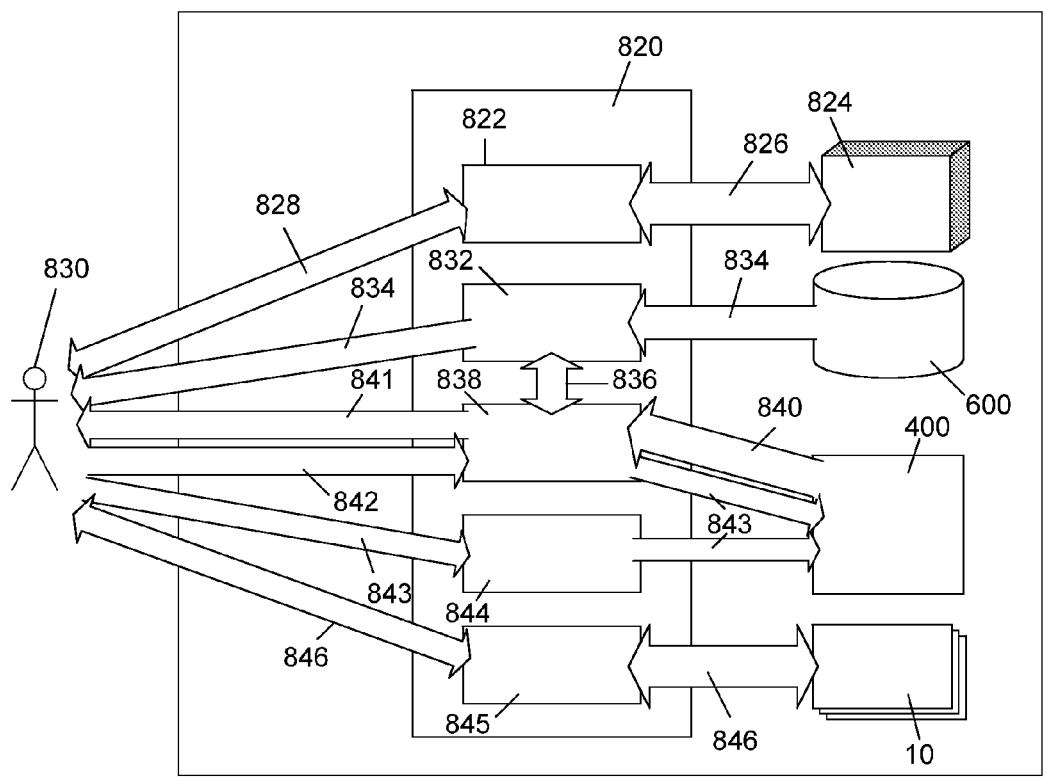
FIG. 9 shows a schematic description of the architecture of the Expert Group Feedback Manager Module.

The Expert Group Feedback Manager Module 820 is part of the Control Center 800 of the system 10 of the invention. The main goal of the Expert Group Feedback Manager Module 820 is to provide a set of GUI dialogs, which will present all the relevant information for new eThreats' recognition. In order to discover new eThreats the basic match predefined rules have to be updated. This problem is solved by use of the Data Mining techniques such as Association Rules, Genetic Algorithms, etc, There are two outputs of this task: the new eThreats detection rules and the list of files or processes that support the new rules creation. This module supplies a panel of human experts with the ability to configure and monitor the modules of the system 10. The architecture of the Expert Group Feedback Manager Module 820 is shown in FIG. 9.

The Expert Group Feedback Manager Module 820 conceptually is divided into the following five components: eTime Control & GUI 822, Storage Manager Explorer 832, Conflict Resolver 838, Manual eThreats Loader 844, and System Configuration Center 845.

The eTime Control & GUI Component 822 provides a graphic interface allowing the experts group a way to monitor, control, and interact 826 with the eTime framework 824. The eTime framework, which is described in Co-pending Patent Application IL173472 by the same applicant, the description of which, including publications referenced therein, is incorporated herein by reference, can analyze data collected from various sources, such as end-user devices, network element, network links etc., to identify potentially infected devices, files, sub-streams or network segments.

The Storage Manager Explorer 832, Manual eThreats Loader 844, and the Configuration Center 845 enable the panel of experts to monitor and configure various modules of the system 10 of the invention. The Conflict Resolver Component 838 is responsible for receiving alerts 840 from New eThreat Detection Module 400, providing relevant information to handle it, and processing the expert's decision 842 regarding the potential eThreat that has triggered an alert.

The Conflict Resolver Component 838 receives alerts 840 from the New eThreat Detection Module 400 when the later module is unable to determine whether an examined file is or is not an eThreat. Component 838 also provides relevant information to help interpret the alert and to give the experts 830 a way to reply to this alert. Conflict Resolver Component 838 arranges all of the alerts in a priority queue with respect to the score given by New eThreat Detection Module 400 and the latency of the alert. At the time the experts respond to the alert, all the information 841 concerning the judgments of the New eThreat Detection Module 400 are presented and there is also provided a way to receive more information 836, available at Storage Manager 600 via Storage Manager Explorer 832.

The input of Conflict Resolver Component 838 consists of information about a suspicious eThreat 840, including the score of the risk it poses that is provided by the New eThreat Detection Module 400, all of the information requested via the Storage Manager Explorer 836, and the expert's final decision regarding particular alert 842. This component alerts 841 the experts that a new request has arrived and places it in the proper location in the priority queue. One method of determining the priority of the alert is with respect to the risk it poses and the time of arrival (to avoid a situation in which old alerts are overlooked because of new more important alerts). The output is a queue of available alerts and conflicts resolved.

The Manual eThreats Loader Component 844 provides a way for experts to insert new eThreat signatures 843 to the system 10 of the invention. The input of the Manual eThreats Loader 844 is eThreat file/s. This component forwards the eThreat to the New eThreat Detection Module 400 for signature construction and further handling.

The Storage Manager Explorer Component 832 is responsible for providing controlled read only access to the storage manager 600. The following information could be presented:
  Risk assessment of specific known (by system 10) eThreats;
  Risk assessment of the NSP network;
  Current configuration properties of configurable system 10 components;
  Known eThreats' library;
  Decisions made by the New eThreat Detection Module 400;
  Decisions made by Experts' Group 830 regarding potential eThreats;
  Statistical information may be gathered and released by the Known eThreat Handler Module 200; and
  Reports released by the modules of system 10.

The Storage Manager Explorer Component 832 identifies the requested information and presents it to the experts 830; hence the output of the Storage Manager Explorer Component 832 is all the data described above.

The Configuration Center Component 845 is responsible for applying configuration settings 846 to the configurable system 10 modules. The input of Configuration Component 845 is configuration properties that should be applied.

Inputs of the Expert Group Feedback Manager Module 820 include:
  Information 828 for eTime Control & GUI Component 822.
  Alerts on suspicious eThreats, which should be examined by experts 830:
    alert information: i.e., time triggered, source agent;
    the body of an eThreat (the code/instance of a suspected eThreat); and
    the scores by categories of a suspected eThreat provided by the New eThreat Detection Module 400.
  Information 843 provided to the Manual eThreat Loader Component 844:
    full body (code/instance) of a new eThreat; and
    every other piece of information, which is relevant for signature constructing.
  Requests from experts 830 for information 834 from the Storage Manager Explorer Component 832:
    requests for risk assessment of specific known (by system 10) eThreats;
    requests for risk assessment of the NSP network;
    requests for current configuration properties of configurable system 10 components;
    requests for the known eThreats' library;
    request for decisions made by the New eThreat Detection Module 400;

request for decisions made by the Experts Group 830 regarding an eThreat recognition;

requests for statistical information which optionally may be gathered and released by the Known eThreat Handler Module 200; and requests for reports released by the modules of system 10.

Configuration properties that should be applied to the modules of the system 10 of the invention and eTime.

Outputs of the Expert Group Feedback Manager Module 820 include:

Output to the experts group 830:
   available alerts waiting for experts' response;
   information regarding potential eThreats:
      information available after analysis by the New eThreat Detection Module 400 of suspicious code by various categories.
      information available at the Storage Manager 600 regarding suspicious eThreats (provided by various modules).
   output to eTime 824;
   monitoring and configuration information of system 10:
      current configurations of various modules of system 10;
      default configurations of various modules of system 10; and
      information on the activities of various modules of system 10.

Output to other modules of system 10:
   output 826 to the eTime framework 824;
   decisions 843 of the experts group 830 to the New eThreat Detection Module 400;
   bodies/instances of new eThreats sent to the New eThreat Detection Module 400 for signature construction; and
   configuration properties applied to various modules of system 10.

The purpose of the Attack Trace-Back module 850 is to help in tracing back the source of an eThreat. The module computes a subset of users/hosts that are suspected to be the source of an eThreat using the historical data on its propagation that has been collected.

Ideally the best way to perform trace-back requires that a log of all files going from each user/router/IP to each user/router/IP gathered in every machine in the network be maintained. Since this is not possible, the log used in the system of the invention contains at least the following data: Timestamp, File ID, Source IP, and destination IP.

To trace back an instance of an eThreat all records related to this eThreat are extracted from the log using its file ID. The following definitions enable the whole propagation tree of the eThreat to be constructed:

1. $IP_1$ is said to have "sent" an eThreat e' to $IP_2$ if the following record exists in the log: $timestamp_1$, e', $IP_1$, $IP_2$.
2. $IP_1$ is said to have "infected" $IP_2$ with an eThreat e' if:
   i. $IP_1$ "sent" e' to $IP_2$.
   ii. No one else "sent" e' to $IP_2$ previously and $IP_2$ didn't "send" e' to anyone else previously.
3. $IP_1$ is the "source "of an eThreat e' if he "sent" e' to someone else and no one else "infected" $IP_1$.

After constructing the propagation tree the source of the attack can be found by using these definitions. Since this requires a huge amount of resources only logs of some IPs are kept. To trace back an instance of an eThreat, all records containing this eThreat are extracted from the logs that are available using the file IDs. As a result of the fact that all logs are available, the constructed propagation tree will be incomplete and therefore can comprise several disconnected trees (see FIG. 10). In this case, the social network can be used to complete missing links. A missing link from $IP_1$ to $IP_2$ can be completed if:

1. There is a link from $IP_1$ to $IP_2$ in the social network.
2. The 'virtual' link is within the constraints of the time frame in which the eThreat spread.

Figure 10:
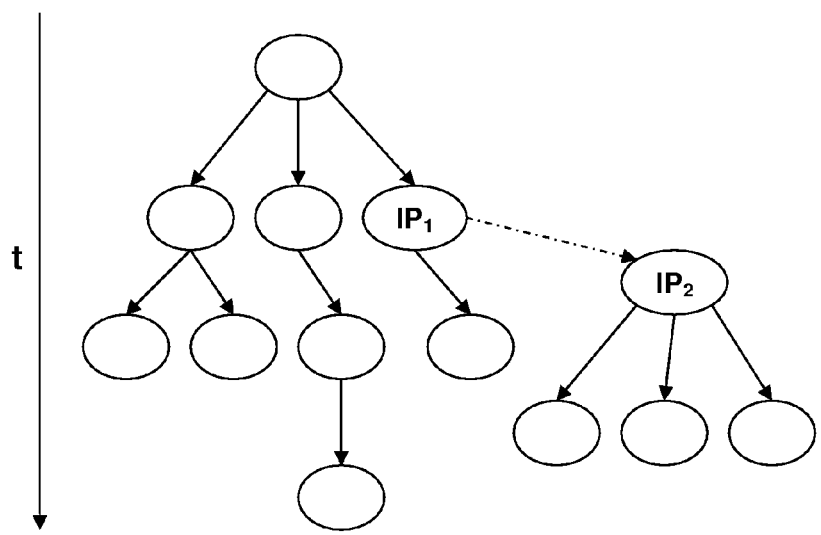
FIG. 10 schematically shows the time-lined trees of the propagation of a file from $IP_1$ to $IP_2$ as listed in the logs that have been collected and made available to Attack Trace-Back module.

FIG. 10 schematically shows the time-lined trees of the propagation of a file from $IP_1$ to $IP_2$ as listed in the logs that have been collected and made available to Attack Trace-Back module 850. The dotted line doesn't appear in the logs but is complete it from information available relating to the social network if there is enough time between the timestamp in which $IP_1$ received the eThreat and the timestamp in which $IP_2$ sent the eThreat.

Figure 11:
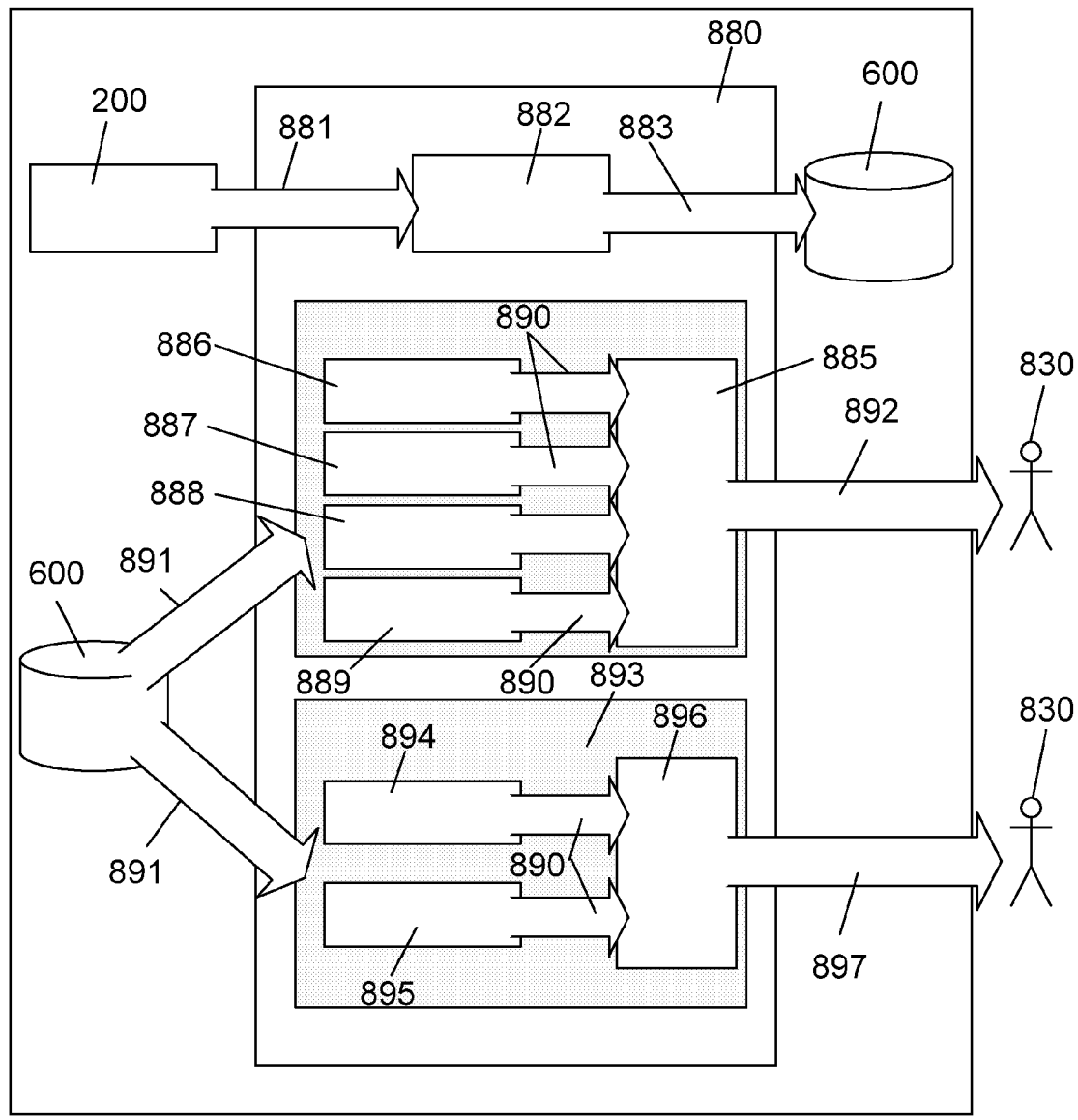
FIG. 11 shows a schematic description of the architecture of the Risk Assessment Module.

The Risk Assessment Module 880 is a part of the system Control Center 800. The main goal of the Risk assessment Module is to measure the risk of a specific eThreat and also the risk of all known (by system 10) eThreats over the NSP network. The components of this module collect relevant information for risk assessment from the Storage Manager 600 and provide risk assessments to the experts group 830 via the Experts Group Feedback Manager Module 820. The conceptual architecture of the Risk Assessment Module 880 is presented in FIG. 11.

The Risk Assessment Module 880 is conceptually divided into three components: Data Analyzing and Summarizing Component 882, Particular Risk Measurement Component 884, and the Net Risk Measurement Component 893. Each of these components is designed and implemented with flexibility in mind to allow modifications of the criteria and techniques applied for risk assessment.

The Data Analyzing and Summarizing Component 882 is responsible for collecting the statistical information 881 released by the Known eThreats Handler Module 200, detecting and summarizing the relevant information 883 (for various criteria), and storing it in the Storage Manager 600 for further risk assessments. The input 881 to the Data Analyzing and Summarizing Component 882 consists of all the statistical information released by the Known eThreats Handler Module 200, e.g.: the portion of malicious traffic within the total traffic; the number of instances filtered for each known eThreat, etc. This component analyzes the input data and detects relevant information for all criteria presented in the Particular Risk Measurement Component 884 and the Net Risk Measurement Component 893. Next, the information is accumulated and summarized before storing it in the Storage Manager 600. The output of the Data Analyzing and Summarizing Component 882 is therefore summarized data, which is relevant for the criteria, presented in the Particular Risk Measurement Component 884 and Net Risk Measurement Component 893. The summarized data is stored in the Storage Manager 600 on a periodical basis, as predefined by the group of experts 830 or according to some default configuration of the system 10. Once a risk assessment is requested, the most up-to-date information in the Storage Manager 600 will be used.

The Particular Risk Measurement Component 884 is responsible for measuring the risk of a particular known eThreat, i.e. an eThreat that is known to the system 10. The Particular Risk Measurement Component 884 is composed of various criteria 886-889, which can be modified and appended, and an Overall Severity Component 885. Component 885 provides an overall severity measure 892 of particular eThreats based on predefined criteria. Each criterion component 886-889 is responsible for requesting relevant information 891 from the Storage Manager 600, for processing the information, for generating a score 890 for the particular aspect of risk for the given criterion and sending the criterion score 890 to the Overall Severity Component 885. The input 891 to the Particular Risk Measurement Component 884 consists of various data relevant for risk assessment as defined by the criteria, and the relevancy of information is defined by criteria components composing the Particular Risk Measurement Component 884.

Many different criteria can be used to measure the risks of eThreats. For example, the present embodiment of the Particular Risk Measurement Component 884 of the Risk Assessment Module 880 employs four criteria:

- The Abundance over the net criterion 886 measures the potential risk of an eThreat based on the number of times it is identified over the ISP network. The input to this criterion is an amount (e.g. number of instances) of this eThreat filtered by the Known eThreat Handler Module 200 over a specified recent time period. This information is released by the Known eThreat Handler Module 200 and summarized and later stored by the Data Analyzing and Summarizing Component 882.
- The distribution rate criterion 887 measures the potential risk of an eThreat based on its distribution rate. The input to this criterion consists of quantity measurements of this eThreat as filtered by the Known eThreat Handler Module 200 over recent time periods. Additional input for this component is the duration that a particular eThreat has been known to system 10, since the distribution rate must be considered over time. As the duration of time that such information is collected for this eThreat grows, system 10 gradually becomes more familiar with the eThreat and the precision of this criterion's measurement increases.
- The damage measure criterion 888 measures the risk of an eThreat based on its potential to inflict damage to the infected system or user, thus the input of this component consists of the measurement of potential damage that a given eThreat may cause. This information is measured by the New eThreat Detection Module 400 at the time it recognizes a new or suspicious eThreat and is made available in the Storage Manager 600.
- The target system criterion 889 measures the potential risk of an eThreat based on the number of occurrences of the targeted system that this eThreat may infect or run on, thus the input of this module is the abundance of the targeted system on the network. The targeted system is identified by the New eThreat Detection Module 400 at the time it recognizes a new or suspicious eThreat and the identification is made available to the Storage Manager 600. The abundance of the targeted system is provided by the Collaborative eThreat Recognition Module 500 based on information provided by the Protection & Feedback Agents 700 which is made available from the Storage Manager 600.

Each criterion module 886-889 provides its quantitative assessment 890 in the form of a risk score and a relative weight of the precision of the score. The Overall Severity Component 885 processes all the provided risk scores 890 assigned by the various criteria components 886-889 and calculates the overall risk assessment 892, which is provided to the group of experts 830 via the Experts Group Feedback Manager Module 820.

The Net Risk Measurement Component 893 is responsible for measuring the potential risk to the ISP network caused by known (to the system 10) eThreats. The design of the Net Risk Measurement Component 893 is very similar to that of the Particular Risk Measurement Component 884. It comprises various criteria 894-895 that can be modified at any time and an Overall Severity Component 896. Component 893 provides an overall severity score 897 of risk over the ISP network based on the defined criteria. Each criterion component 894-895 has been developed in a very similar manner to that of the criterion components 886-889 of the Particular Risk Measurement Component 884. The input 891 to the Net Risk Measurement Component 893 consists of various data relevant for risk assessment by the defined criteria, wherein the relevancy of information is defined by the criterion components.

The present embodiment of the Risk Assessment Module comprises two criteria:

- The malicious traffic portion criterion 894 measures a potential eThreat risk based on the relative portion of the traffic that has been filtered by the Known eThreats Handler Module 200 during the recent time period. Its input is data regarding the portion of the ISP network traffic identified as malicious and filtered-out by the Known eThreat Handler Module 200 over the recent time period. This information is collected by the Known eThreat Handler Module 200 and stored in the Data Analyzing and Summarizing Component 882.
- The user's feedback criterion 895 measures a potential eThreat risk based on feedbacks from users 40 or Protection and Feedback Agents 700. Its input consists of an average rating of the level of protection and risk to system 10 as reported over the recent time period by clients 40 or by Agents 700 installed on their local systems. This information is provided by the Collaborative eThreat Recognition Module 500 made available in the Storage Manager 600.

Each criterion module 894-895 provides its score and the relative weight of its score's precision. The Overall Severity Component 896 processes all the scores 890 provided by the various criteria components and calculates the overall risk assessment 897, which is provided to the experts group 830 via the Experts Group Feedback Manager Module 820. Thus, the output of this component is an assessment of risk over the entire NSP network.

The Inputs of the Risk Assessment Module 880 include:
- Statistical information 881 released by the Known eThreats Handler Module 200:
  - The part of malicious traffic that was filtered out by the Known eThreat Handler Module 200; and
  - The number of instances of each particular eThreat that was filtered by the Known eThreat Handler Module 200.
- Statistical information, which is stored by the Risk Assessment Module 880:
  - The number of instances of a particular eThreat filtered by the Known eThreat Handler Module 200 over a recent time period; and
  - The average portion of malicious traffic, which was filtered by the Known eThreat Handler Module, from the ISP network traffic over a recent time period.
- The interval of time that a given eThreat has been known to system 10.
- The measurement of potential damage that a given eThreat may inflict.
- The total numbers of the system targeted by a given eThreat.
- The average rating of system protection and risk over the network as reported by the ISP clients 40 or by Agents 700 installed on their systems.

The outputs of the Risk Assessment Module 880 include:

Risk Assessment 892 of a given eThreat (known by the system 10).

Risk Assessment 897 of the ISP network, based on known (by the system 10) eThreats over the network.

Although embodiments of the invention have been described by way of illustration, it will be understood that the invention may be carried out with many variations, modifications, and adaptations, without exceeding the scope of the claims. In particular, art skilled persons will be able to distinguish between the conceptual architecture of the system of the invention and the physical architecture, which can be implemented in many different ways.

BIBLIOGRAPHY

1. Symantec Internet Security Threat Report, January-June, 2004. www.symantec.com.
2. Yegneswaran, V., Barford, P., and Ullrich, J. (2003) Internet intrusions: global characteristics and prevalence. *SIGMETRICS* 2003, pp. 138-147.
3. Leverhugen, R. Trends, codes and virus attacks—2003 year, in review. *Network Security*, January 2004.
4. Cuppens, F. and Miege, A. Alert correlation in a cooperative intrusion detection framework. In *Proceedings of IEEE Symposium on Security and Privacy*, 2002.
5. Zenkin, D. Guidelines for the Protecting the Corporate against Viruses. *Computers & Security*, 20 (2001), pp. 671-675.
7. Bloedorn, E. et al. Data Mining for Network Intrusion Detection: How to Get Started, MITRE Technical Report, August 2001.
8. Eskin, E., Arnold, A., Prerau, M., Portnoy, L., Stolfo, S. A Geometric Framework for Unsupervised Anomaly Detection: Detecting Intrusions in Unlabeled Data, *Data Mining for Security Applications*, Kluwer 2002.
9. Ertoz, L., Eilertson, E., Lazarevic, A., Tan, P., Srivastava, J., Kumar, V., Dokas, P., *The MINDS—Minnesota Intrusion Detection System*, Next Generation Data Mining, MIT Press, 2004.
10. Ertoz, L., Eilertson, E., Lazarevic, A., Tan, P., Dokas, P, Srivastava, J., Kumar, V. Detection and Summarization of Novel Network Attacks Using Data Mining.
11. Madhusudan, B., Lockwood, J. Design of a System for Real-TimeWorm Detection. Published in 12*th Annual IEEE Symposium on High Performance Interconnects (Hot-I)*, August, 2004, Stanford, Calif., pp. 77-83.
12. Mitzenmacher, M. Compressed Bloom filters. *Networking, IEEE/ACM Transactions* Volume: 10, Issue: 5, October 2002 pp. 604-612.
13. Attig, M., Dharmapurikar, S. and Lockwood, J. Implementation Results of Bloom Filters for String Matching, In Proceedings of: *IEEE Symposium on Field-Programmable Custom Computing Machines (FCCM)*, Napa, Calif., Apr. 20-23, 2004. 15. Verwoerd, T., Hunt, R. Intruision detection techniques and approaches. *Computer Communication*, 25, 2002, 1356-1365.
16. Neubauer, B. J., Harris, J. D. Protection of computer system from computer viruses: ethical and practical issues. *Consortium for Computing Sciences in Colleges, Rocky Mountain Conference*, 2002.
17. Lockwood, J., Moscola, J., Reddick, D., Kulig, M. and Brooks, T. Application of hardware accelerated extensible network nodes for internet worm and virus protection. In *International Working Conference on Active Networks (IWAN)*, (Kyoto, Japan), December 2003.
18. Lockwood, J., Moscola, J., Reddick, D., Kulig, M. and Brooks, T. Internet Worm and Virus Protection in Dynamically Reconfigurable Hardware. *MAPLD* 2003, September 2003, paper E10. http://www.arl.wustl.edu/arl/projects/fpx
19. Lockwood, W. Evolvable Internet Hardware Platforms. *Evolvable Hardware Workshop*, Long Beach, Calif., USA, Jul. 12-14, 2001, pp. 271-279.
20. Sidhu, R. and Prasanna, V. K. Fast Regular Expression Matching using FPGAs. *Field-Programmable Custom Computing Machines (FCCM)*, Rohnert Park, Calif., USA, April 2001.
21. Lockwood, J., Naufel, N., Turner, J. and Taylor, D. Reprogrammable network packet processing on the field programmable port extender (fpx). In *ACM International Symposium on Field Programmable Gate Arrays (FPGA'*2001), (Monterey, Calif.), pp. 87-93, February 2001.
22. Jung, J., Schechter, St. and Berger, A. *Fast Detection of Scanning Worm Infections. Seventh International Symposium on Recent Advances in Intrusion Detection (RAID)*, Sophia Antipolis, French Riviera, France. Sep. 15-17, 2004
23. Bakos, G. and Berk, V. Early detection of internet worm activity by metering ICMP destination unreachable messages. In *Proceedings of the SPIE Aerosense,* 2002.
24. Berk, V., Bakos, G. and Morris, R. Designing a framework for active worm detection on global networks. In *Proceedings of the IEEE International Workshop on Information Assurance, March* 2003.
25. Liljenstam, M., Nicol, D., Berk, V., Gray, R. Simulating Realistic Network Worm Traffic for Worm Warning System Design and Testing, *WORM'*03, Washington, D.C., USA, Oct. 27, 2003.
26. Kanlayasiri, U., Sanguanpong, S. and Jaratmanachot, W. A Rule-based Approach for Port Scanning Detection". *Applied Network Research Group*.
27. Kephart, J., Chess, D. and White, S. Computers and Epidemiology. *IEEE Spectrum,* 1993.
28. Christodorescu, M., Jha, S. Static Analysis of Executables to Detect Malicious Patterns, working paper, Computer Sciences Department University of Wisconsin, Madison
29. Larochelle, D., Evans, D. Statically Detecting Likely Buffer Overflow Vulnerabilities, February, 2003.
30. Kephart, J. and White, S. Measuring and Modeling Computer Virus Prevalence. In *Proceedings of the IEEE Symposimum on Security and Privacy,* 1993.
31. Wang, H., Guo, Ch., Simon, D. and Zugenmaier, A. Shield: Vulnerability-Driven Network Filters for Preventing Known Vulnerability Exploits, *SIGCOMM'*04, Portland, Oreg., USA. Aug. 30-Sep. 3, 2004.
32. Microsoft Corp. URLScan Security Tool. http://www.microsoft.com/technet/security/URLScan.asp.
33. Iheagwara, C., "The effect of intrusion detection management methods on the return on investment", *Computers and Security*, May 2004.
34. Cranor, L., Resnick, P. and Gallo, D. A Catalog of Tools that Support Parents' Ability to Choose Online Content. *America Links Up*, September 1998.
35. Zou, C., Gao, L., Gong, W. and Towsley, D. Monitoring and Early Warning for Internet Worms. In 10*th ACM Symposium on Computer and Communication Security*, Washington D.C., 2003.

The invention claimed is:

1. A computer system that provides early warning detection and response to electronic threats in a large wide area network, said system comprising:

(a) a virtual Anonymity, Privacy, and Secrecy (APS) module comprised of several components distributed throughout said system, said APS module comprising components that are adapted to identify and remove data carrying personal information and to enable secure encrypted communications between modules in said system, thereby insuring that the anonymity, privacy and secrecy of all users of said large wide area network are preserved while enabling said system to perform its function;

(b) one or more physical Known eThreat Handler (KEHM) modules that are deployed inside said large wide area network, said KEHM modules comprising components that are adapted to look for a match between signatures of known eThreats and the stream of Internet packets in real-time, thereby identifying and removing known eThreats from data stream;

(c) one or more physical Data Stream Manager (DSM) modules that are deployed inside said large wide area network, said DSM modules comprising components that are adapted to:
  (i) receive the data stream that has been forwarded from said KEHM modules;
  (ii) forward said data stream to the target computer;
  (iii) extract files from said data stream by filtering out traffic that has no potential to assist with eThreat detection and traffic that has a potential to assist with detection of new eThreats;

(d) a physical New eThreat Detection module not directly connected to the large wide area network data stream, said module comprising:
  (i) a plurality of detection plug-ins each of which is adapted to analyze and provide a subjective numeric grade for the danger posed by the suspected eThreat in a file or a file from other sources;
  (ii) a risk weighing component that is adapted to combine the numeric grades provided by said plurality of detection plug-ins to provide a final rank for each of said eThreat files in order to determine if a new eThreat has been detected; and
  (iii) components that are adapted to construct a unique signature for each new eThreat detected;

(e) a physical Collaborative eThreat Recognition module not directly connected to said large wide area network data stream, said Collaborative eThreat Recognition module comprising components that are adapted to apply rule-based detection techniques to information received from various system agents and users to detect potential new eThreats;

(f) a physical Storage Manager module not connected directly to said large wide area network data stream, said Storage Manager module comprising components that are adapted to:
  (i) store and manage files sent to said module by other modules of said system; and
  (ii) store information about said files managed by said module;

(g) a physical Control Center module not connected directly to said large wide area network data stream, which comprises graphic user interfaces and other components that are adapted to provide all information gathered by other modules of said system that is relevant to the recognition of new eThreats to a human expert group that is responsible for running said system and to provide feedback from said human expert group to modules of said system;

(h) communication links between said modules of said system; and (i) the Control Center modules comprising an Attack-Trace-Back module adapted to trace back the source of an eThreat by constructing a propagation tree from a log.

2. The computer system according to claim 1, wherein the large wide area network is the network of an Internet Services Provider (ISP) or a Network Services Provider (NSP).

3. The computer system according to claim 2, wherein all of the modules of said system comprise means that are adapted to be controlled by the staff of the large wide area network.

4. The computer system according to claim 1 comprising a computer executable application installed on the end-user machines, said application adapted to monitor the behavior of running processes in said end-user machines and to report suspicious behavior to Collaborative eThreat Recognition module.

5. The computer system according to claim 1, wherein the log is historical data on the source of the eThreat's propagation that has been collected by the modules of said system.

6. The computer system according to claim 1, comprising detection plug-ins that are adapted to be added to or removed from New eThreat Detection module, thereby adding or removing detection capabilities to/from said system.

7. The computer system according to claim 1, wherein the progagation tree uses a link of a social network or the time frame in which the e-Threat is spread.

* * * * *